US008634785B2

(12) United States Patent
Bhatia et al.

(10) Patent No.: US 8,634,785 B2
(45) Date of Patent: Jan. 21, 2014

(54) RADIO FREQUENCY (RF) SIGNAL MULTIPLEXING

(75) Inventors: Ashok Bhatia, San Diego, CA (US); Dominic Gerard Farmer, Los Gatos, CA (US); Douglas Neal Rowitch, Del Mar, CA (US); Douglas Grover, San Diego, CA (US); Arie Rahmat, San Diego, CA (US); Chang Shik Row, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1062 days.

(21) Appl. No.: 12/431,683

(22) Filed: Apr. 28, 2009

(65) Prior Publication Data

US 2009/0274079 A1 Nov. 5, 2009

Related U.S. Application Data

(60) Provisional application No. 61/049,748, filed on May 1, 2008.

(51) Int. Cl.
*H04B 7/08* (2006.01)
(52) U.S. Cl.
USPC ....................................... 455/132; 455/552.1
(58) Field of Classification Search
USPC ........ 455/131, 132, 552.1, 142, 82, 561, 133, 455/344, 3.06, 136, 240.1, 11.1, 12.1, 73, 455/318, 313, 77, 436–444; 370/310, 312, 370/347, 320, 335; 342/357.63, 357.25, 342/357.76, 357.64
See application file for complete search history.

(56) References Cited

U.S. PATENT DOCUMENTS

| 5,657,317 | A |   | 8/1997 | Mahany et al. |
|---|---|---|---|---|
| 6,018,644 | A | * | 1/2000 | Minarik .......................... 455/82 |
| 6,448,926 | B1 |  | 9/2002 | Wineberg et al. |
| 6,549,529 | B1 | * | 4/2003 | Drabeck et al. ............... 370/347 |
| 6,891,485 | B2 | * | 5/2005 | Jaffe et al. ........................ 341/81 |
| 7,502,625 | B2 |  | 3/2009 | Beamish et al. |
| 2001/0008835 | A1 | * | 7/2001 | Tawil et al. .................... 455/133 |
| 2005/0233765 | A1 | * | 10/2005 | Sanders et al. ............. 455/552.1 |
| 2007/0237105 | A1 | * | 10/2007 | Onomatsu ..................... 370/312 |
| 2008/0319961 | A1 | * | 12/2008 | Mankovitz ........................ 707/4 |

FOREIGN PATENT DOCUMENTS

| CN | 1380984 A | 11/2002 |
|---|---|---|
| CN | 1998145 A | 7/2007 |

OTHER PUBLICATIONS

International Search Report & Written Opinion—PCT/US2009/042144, International Search Authority—European Patent Office—Aug. 12, 2009.

* cited by examiner

*Primary Examiner* — Edward Urban
*Assistant Examiner* — Golam Sorowar
(74) *Attorney, Agent, or Firm* — Thien T. Nguyen

(57) ABSTRACT

In a radio frequency (RF) receiver, a receiver RF chain is tuned to a first (e.g., global positioning system (GPS)) channel to permit receipt of a first (e.g., GPS) signal over the first (e.g., GPS) channel on the receiver RF chain during a first time duration. The receiver RF chain is tuned to a second (e.g., cellular page) channel to permit receipt of a second (e.g., cellular page) signal over the second (e.g., cellular page) channel on the receiver RF chain during a second time duration, following the first time duration. The first (e.g., GPS) signal is processed during the first time duration and the second time duration, without any apparent interruption of the first (e.g., GPS) signal during the second time duration. The processing, for example, provides a bridge signal (e.g., an estimated GPS signal on the receiver RF chain) during the second time duration.

14 Claims, 14 Drawing Sheets

RADIO FREQUENCY (RF) SIGNAL MULTIPLEXING

CROSS REFERENCE TO RELATED APPLICATION

The present application claims the benefit of and priority to U.S. Provisional Patent Application No. 61/049,748, entitled, "System and Apparatus to Multiplex Single RF Chain Across GPS and Cellular System Paging Channel Operations," filed on May 1, 2008, which is assigned to the assignee hereof and which is expressly incorporated herein by reference.

BACKGROUND

1. Background Field

The present disclosure generally relates to radio frequency (RF) communications. More particularly, the present disclosure relates to multiplexing a first (e.g., global positioning system (GPS)) signal and a second (e.g., cellular paging signal) on a single receiver RF chain. In addition, the present invention relates to multiplexing a signal (e.g., global positioning system (GPS) signal) between two different receiver RF chains.

2. Relevant Background

In radio frequency (RF) communication applications, an RF receiver or a receiver portion of an RF transceiver is an electronic circuit that receives an input from an antenna, and uses electronic filters to separate a radio signal of interest from all other radio signals received by the antenna. An amplifier amplifies the radio signal of interest to a level suitable level for processing. A local oscillator generates a local oscillator signal for a mixer to down convert the amplified radio frequency signal from one frequency to a different lower frequency. The converted frequency signal is further filtered, amplified, demodulated, and decoded into a usable form, such as sound, pictures, digital data, measurement values, navigational positions, etc.

An RF transmitter or a transmitter portion of an RF transceiver is an electronic circuit that receives an input signal, such as sound, pictures, digital data, measurement values, navigational positions, etc. The input signal is processed by being encoded, modulated, filtered, and amplified into an electronic signal. A local oscillator generates a local oscillator signal for a mixer to up convert the electronic signal from one frequency to a different higher frequency. The converted signal is further filtered and amplified to a level suitable for transmission. The amplified signal is radiated by an antenna to transmit the amplified signal as a radio frequency signal at a particular frequency.

An RF transmitter embodied as cellular phone, for example, may be employed in an RF communication system having multiple frequency bands associated with multiple air interface processes, providing services such as sound (e.g., voice), data (e.g., video, internet, text, etc.)3, location positioning (e.g., GPS), for example. To communicate over one or more of the multiple frequency bands, at the same time or different times, the cellular phone must be provided with receiver and transmitter functions compatible with the RF communication system. As summarized above, each of a receiver and a transmitter have many complicated functions to provide RF communications. If each receiver and transmitter were duplicated for each of the multiple frequency bands of the RF communication system, the cellular phone would become too big and too expensive. It would be desirable to provide a cellular phone with efficient receiver and transmitter functions to be compatible with an RF communication system having multiple frequency bands, without adding to the size or cost of the cellular phone.

Further limitations and disadvantages of conventional and traditional approaches will become apparent to one of skill in the art of RF transceiver designs, through comparison of such systems with some aspects of the present invention, as set forth in the remainder of the present application with reference to the drawings.

SUMMARY

According to one aspect of the present invention, a method includes tuning to a first channel on a receiver radio frequency (RF) chain to permit receipt of a first signal during a first time duration, and then tuning to a second channel on the receiver RF chain to permit receipt of a second signal during a second time duration, following the first time duration. The method also includes processing the first signal during the first time duration and during the second time duration, without any apparent interruption of the first signal during the second time duration.

In another aspect, a method includes tuning to a satellite positioning system (SPS) channel on a receiver radio frequency (RF) chain to permit receipt of at least one SPS signal during a first time duration, and then tuning to a cellular page channel on the receiver RF chain to permit receipt of a cellular page signal during a second time duration, following the first time duration. The method also includes processing the SPS signal during the first time duration and during the second time duration, without any apparent interruption of the SPS signal during the second time duration.

In yet another aspect, a method includes tuning to a satellite positing system (SPS) channel on a receiver radio frequency (RF) chain, and then receiving a SPS signal on the SPS channel on the receiver RF chain during a first time duration in response to tuning to the SPS channel. The method also includes interrupting the receiving of the SPS signal over the SPS channel on the receiver RF chain, and then tuning to a cellular page channel on the receiver RF chain in response to interrupting the receiving of the SPS signal. The method further includes receiving a cellular page signal, when present, on the cellular page channel on the receiver RF chain during a second time duration, following the first time duration in response to tuning to the cellular page channel. A bridge signal is provided, representative of the SPS signal that was expected to be received over the SPS channel on the receiver RF chain during the second time duration. The SPS signal is processed during the first time duration and the bridge signal is processed during the second time duration, without any apparent interruption of the SPS signal during the second time duration.

In still another aspect, a radio frequency (RF) receiver includes a receiver radio frequency (RF) chain having a tuning signal processor. The tuning signal processor tunes to a first channel on the receiver RF chain to permit receipt of a first signal over the first channel during a first time duration, and tunes to a second channel on the receiver RF chain to permit receipt of a second signal over the second channel during a second time duration, following the first time duration. A signal processor processes the first signal during the first time duration and during the second time duration, without any apparent interruption of the first signal during the second time duration.

In a still further aspect, a radio frequency (RF) receiver includes means for tuning to a first channel on a receiver radio frequency (RF) chain to permit receipt of a first signal over the first channel during a first time duration; means for tuning to a second channel on the receiver RF chain to permit receipt of a second signal over the second channel during a second time duration, following the first time duration; and means for processing the first signal during the first time duration and during the second time duration, without any apparent interruption of the first signal during the second time duration.

In another aspect, a computer readable medium tangibly stores program code. The program code includes program code to tune to a first channel on a receiver radio frequency (RF) chain to permit receipt of a first signal over the first channel during a first time duration. The program code also includes program code to tune to a second channel on the receiver RF chain to permit receipt of a second signal over the second channel during a second time duration, following the first time duration. The program code further includes program code to process the first signal during the first time duration and during the second time duration, without any apparent interruption of the first signal during the second time duration.

In yet another aspect, a method includes tuning to a first channel on a second receiver radio frequency (RF) chain to permit receipt of a first signal over the first channel on the second receiver RF chain during a first time duration. The method also includes tuning to the first channel on a first receiver RF chain, different from the second receiver RF chain, to permit receipt of the first signal over the first channel on the first receiver RF chain during a third time duration. The method further includes processing the first signal from the second receiver RF chain during the first time duration and the first signal from the first receiver RF chain during the third time duration to provide a reconstituted first signal during the first and third time durations.

These and other aspects of the present invention will be apparent from the accompanying drawings and from the following detailed description.

BRIEF DESCRIPTION OF THE DRAWINGS

Aspects of the present invention are illustrated by way of examples and not limitation in the figures of the accompanying drawings, in which like reference numbers designate corresponding elements.

DETAILED DESCRIPTION

The following description and drawings are illustrative of aspects and examples of the invention and are not to be construed as limiting the invention. Numerous specific details are described to provide a thorough understanding of the present invention. However, in certain instances, well-known or conventional details are not described in order to avoid obscuring the description of the present invention. References to one embodiment or an embodiment in the present disclosure are not necessarily to the same embodiment, and such references may include one or more embodiments.

Figure 1:
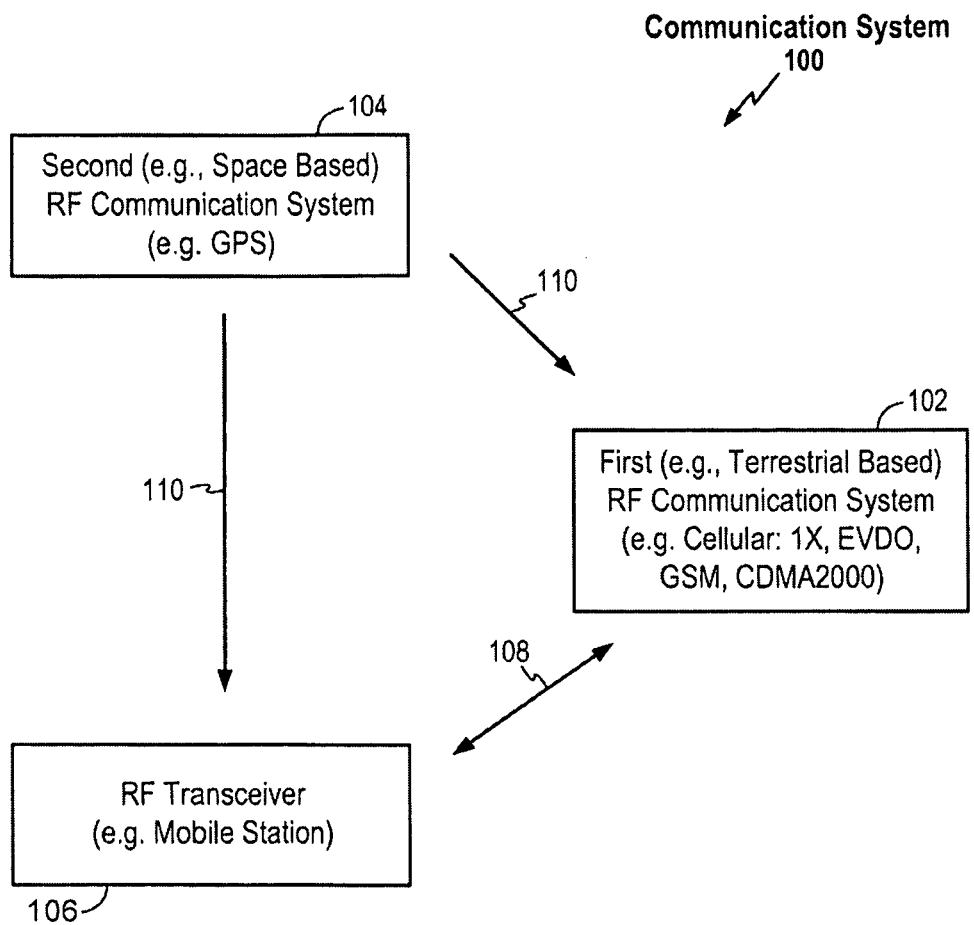
FIG. 1 illustrates an example of a block diagram representation of a radio frequency (RF) communication system.

FIG. 1 illustrates an example of a block diagram representation of a communication system 100. The communication system 100 generally includes a first radio frequency (RF) communication system 102, a second RF communication system 104, and an RF transceiver 106. The first RF communication system 102 communicates with the RF transceiver over an RF communication link 108. The second RF communication system 104 communicates with the first RF communication system and/or the RF transceiver 106 over RF communication links 110.

In one example, the first RF communication system is a terrestrial based system adapted to communicate cellular signals using one or more air interface standards and having associated signal protocols. The cellular system typically includes multiple cellular base stations ("base station" or "BS") (not shown), a mobile switching center (not shown), and a location server (not shown), which is otherwise called a position determining entity (PDE). The cellular system may provide for multiple access communications, in accordance with any standard or protocol, such as, for example, CDMA, TDMA, FDMA, or GSM, or combinations thereof.

The air interface standards may include, for example, CDMA2000 EVDO (Evolution Data Optimized), CDMA2000 1xRTT or IS-2000, UMTS-TDD (Universal Mobile Telecommunications System—Time Division Duplexing), UMTS W-CDMA (Wideband Code Division Multiple Access) HSDPA (High Speed Downlink Packet Access)+HSUPA (High Speed Uplink Packet Access)+HSPA (High Speed Packet Access), EDGE Evolution, iBurst or HC-SDMA (High Capacity Spatial Division Multiple Access), WiBro (Wireless Broadband), HIPERMAN (High Performance Radio Metropolitan Area Network), Flash-OFDM (Fast Low-latency Access with Seamless Handoff Orthogonal Frequency Division Multiplexing), 802.16e WiMAX (Worldwide Interoperability for Microwave Access), UMTS/4GSM LTE (Long Term Evolution), GSM (Global System for Mobile Communication), or any other air interface standard developed in the future.

In particular, CDMA2000 EVDO is a telecommunications standard for the wireless transmission of data through radio signals, typically for broadband Internet access. CDMA2000 EVDO uses multiplexing techniques including Code Division Multiple Access (CDMA) as well as Time Division Multiple Access (TDMA) to maximize both individual user's throughput and the overall system throughput. An EV-DO channel has a bandwidth of 1.25 MHz, the same bandwidth size that IS-95A (IS-95) and IS-2000 (1xRTT) use. CDMA2000 EVDO standard TIA-856 Rev. B supports up to 14.7 Mbps on the downlink channel and up to 5.4 Mbps on the uplink channel.

In one example, the second RF communication system is a space based system adapted to transmit satellite signals using one or more air interface standards. The air interface standard may include, for example, Global Positioning System (GPS), Galileo, GLOSASS, NAVSTAR, GNSS (Global Navigation Satellite System), a system that uses satellites from a combination of these systems, or any SPS (Satellite Positioning System), including pseudolite systems, developed in the future.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass).

In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

In particular, GPS is a global navigation satellite system developed by the U.S. Department of defense using a constellation of between 24 and 32 medium earth orbit satellites that transmit precise microwave signals, which allow GPS receivers to determine their current location, the time, and their velocity. GPS has become a widely used aid for navigation worldwide, and provides a synchronization resource for cellular networks, such as the CDMA air interface standard.

A GPS receiver calculates its position by precisely timing the signals sent by the GPS satellites. Each satellite continually transmits messages containing the time the message was sent, precise orbital information (the ephemeris), and the general system health and rough orbits of all GPS satellites (the almanac). The GPS receiver measures the transit time of each message and computes the distance to each satellite. Geometric trilateration is used to combine these distances with the location of the satellites to determine the receiver's location. The position is displayed, perhaps with a moving map display or latitude and longitude; elevation information may be included. GPS receivers may also show derived information such as direction and speed, calculated from position changes.

In one example, the RF transceiver 106 is adapted to receive satellite signals using a GPS air interface standard from the second RF communication system 104, and is adapted to communicate (e.g., transmit and/or receive) cellular signals with the first RF communication system using a cellular air interface standard. Although the following description is specifically with respect to GPS, it is noted that any type of SPS could be substituted.

The RF transceiver 106 may be referred to as a mobile station (MS) or a mobile side modem (MSM), for example. The mobile station may be fixed (i.e., stationary) and/or mobile (i.e., portable). The mobile station may be implemented in a variety of forms including, but not limited to, one or more of the following: a personal computer (PC), a desktop computer, a laptop computer, a workstation, a minicomputer, a mainframe, a supercomputer, a network-based device, a data processor, a personal digital assistant (PDA), a smart card, a cellular telephone, a pager, and a wristwatch.

Figure 2:
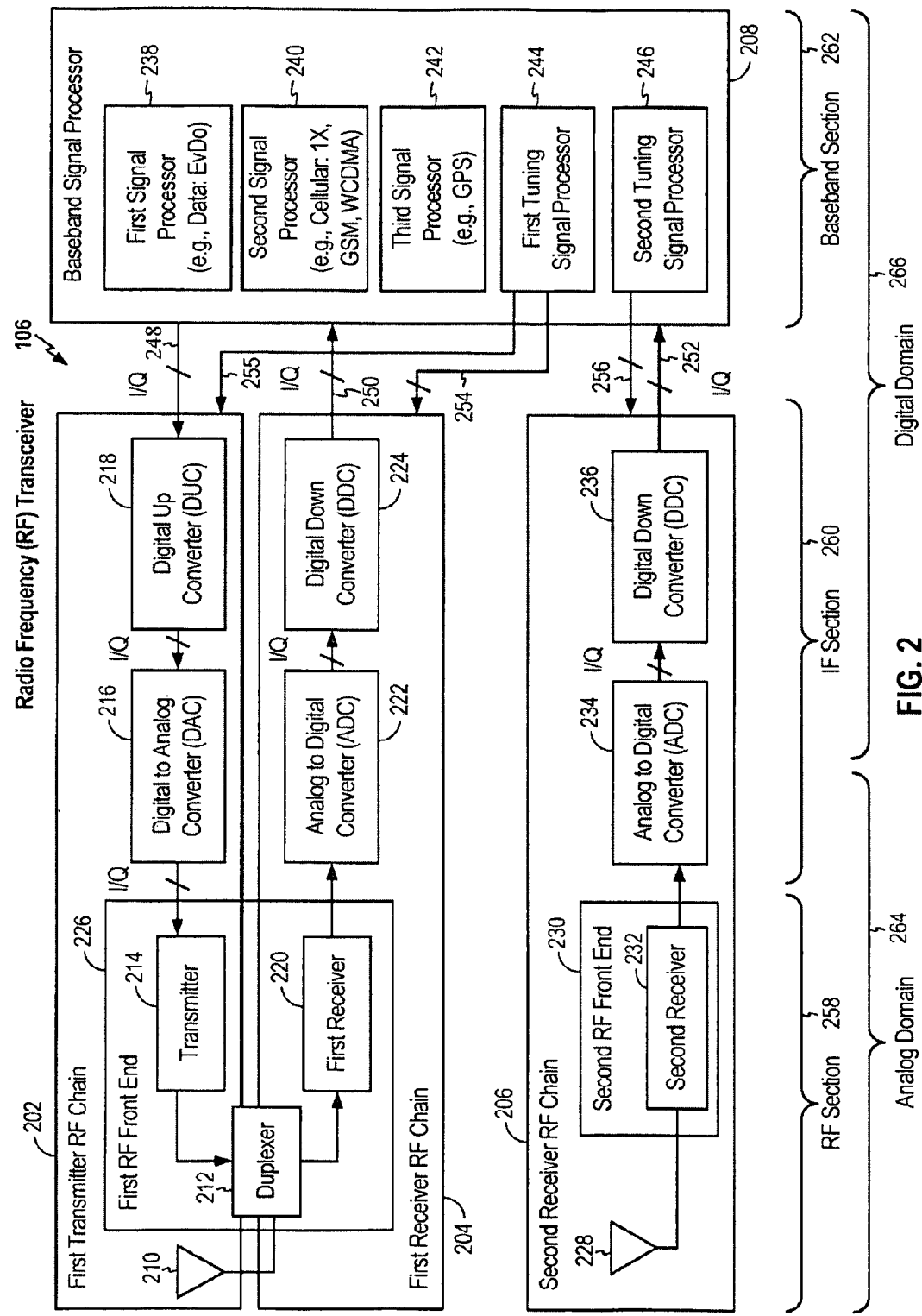
FIG. 2 illustrates an example of a block diagram representation of an RF transceiver, as shown in FIG. 1 and including a first receiver RF chain and a second receiver RF chain.

FIG. 2 illustrates an example of a block diagram representation of the RF transceiver 106, as shown in FIG. 1, according to one aspect of the present invention. The RF transceiver 106 generally includes a first transmitter RF chain 202, a first receiver RF chain 204, a second receiver RF chain 206, and a baseband signal processor 208. In practice, not every RF transceiver design will have all of the elements shown in FIG. 1, nor does the RF transceiver 106, shown in FIG. 1, convey the complexity of other RF transceiver designs.

The first transmitter RF chain 202 generally includes, a first antenna 210, a duplexer 212, a transmitter 214, a digital to analog converter (DAC) 216, and a digital up converter (DUC) 218, of which each element and function thereof is individually known in the art. In operation, the first transmitter RF chain 202 is adapted to transmit cellular signals 248, such as, for example, data and/or voice signals.

The first receiver RF chain 204 generally includes the first antenna 210, the duplexer 212, a first receiver 220, a first analog to digital converter (ADC) 222, and a first digital down converter (DDC) 224, of which each element and function thereof is individually known in the art of digital RF transceiver design. The duplexer 212, the transmitter 214, and the first receiver 220 is referred to as the first RF front end 226. In operation, the first receiver RF chain 204 is adapted to first receive signals 250, represented as, for example, cellular data and/or voice signals, and/or GPS signals.

The second receiver RF chain 206 generally includes a second antenna 228, a second RF front end 230 including a second receiver 232, a second analog to digital converter (ADC) 234, and a second digital down converter (DDC) 236, of which each element and function thereof is individually known in the art of digital RF transceiver design. In operation, the second receiver RF chain 206 is adapted to receive second signals 252, represented as, for example, cellular page signals and/or GPS signals.

The baseband signal processor 208 generally includes a first signal processor 238, a second signal processor 240, a third signal processor 242, a first tuning signal processor 244, and a second tuning signal processor 246. In operation, the first signal processor 238 is adapted to process data signals to be transmitted and/or that are received. In operation, the second signal processor 240 is adapted to process cellular signals to be transmitted and/or that are received. In operation, the third signal processor 242 is adapted to process GPS signals that are received. In operation, the first tuning signal processor 244 is adapted to produce one or more first tuning signals 254 to tune one or more elements of the first receiver RF chain 204, and one or more second tuning signals 255 to tune one or more elements of the first transmitter RF chain 202. In operation, the second tuning signal processor 246 is adapted to produce one or more second tuning signals 256 to tune one or more elements of the second receiver RF chain 206.

The baseband signal processor 208 may include other transmit and receive functions, not shown in the figures. For example, transmit functions include encoding, interleaving, and multiplexing at the symbol rate, and channelization, spreading, and modulation at the chip rate. For example, receive functions include rake receiving, and symbol combining, and finger control at the chip rate, and demultiplexing, deinterleaving, and decoding at the symbol rate.

In one example, an RF section 258 represents the first antenna 210, the first RF front end 226, the second antenna 228, and the second RF front end 230. An intermediate frequency (IF) section 260 represents the DAC 216, the DUC 218, the first ADC 222, the first DDC 224, the second ADC 234, and the second DDC 236. A baseband section 262 represents the baseband signal processor 208. Variations in the RF 258, IF 260 and baseband 262 may be permitted depending on the design of the RF transceiver 106.

In one example, an analog domain 264 represents the first antenna 210, the first RF front end 226, the second antenna 228, the second RF front end 230, and a first half of each of the first DAC 216, the first ADC 222, and the second ADC 234. A digital domain 266 represents a second half of each of the first DAC 216, the first ADC 222, and the second ADC 234, the DUC 218, the first DDC 224, the second DDC 236, and the baseband signal processor 208. Variations in the analog domain 264 and the digital domain 266 may be permitted depending on the design of the RF transceiver 106.

Aspects of the present invention relate to multiplexing the first 250 and the second 252 signals received over the first 204 and second 206 receiver RF chains, respectively, in response to the first 254 and second 256 tuning signals provided by the first 244 and second 246 tuning signal processors, respectively, for processing by the first 238, second 240, and third 242 signal processors, as described herein.

Figure 3:
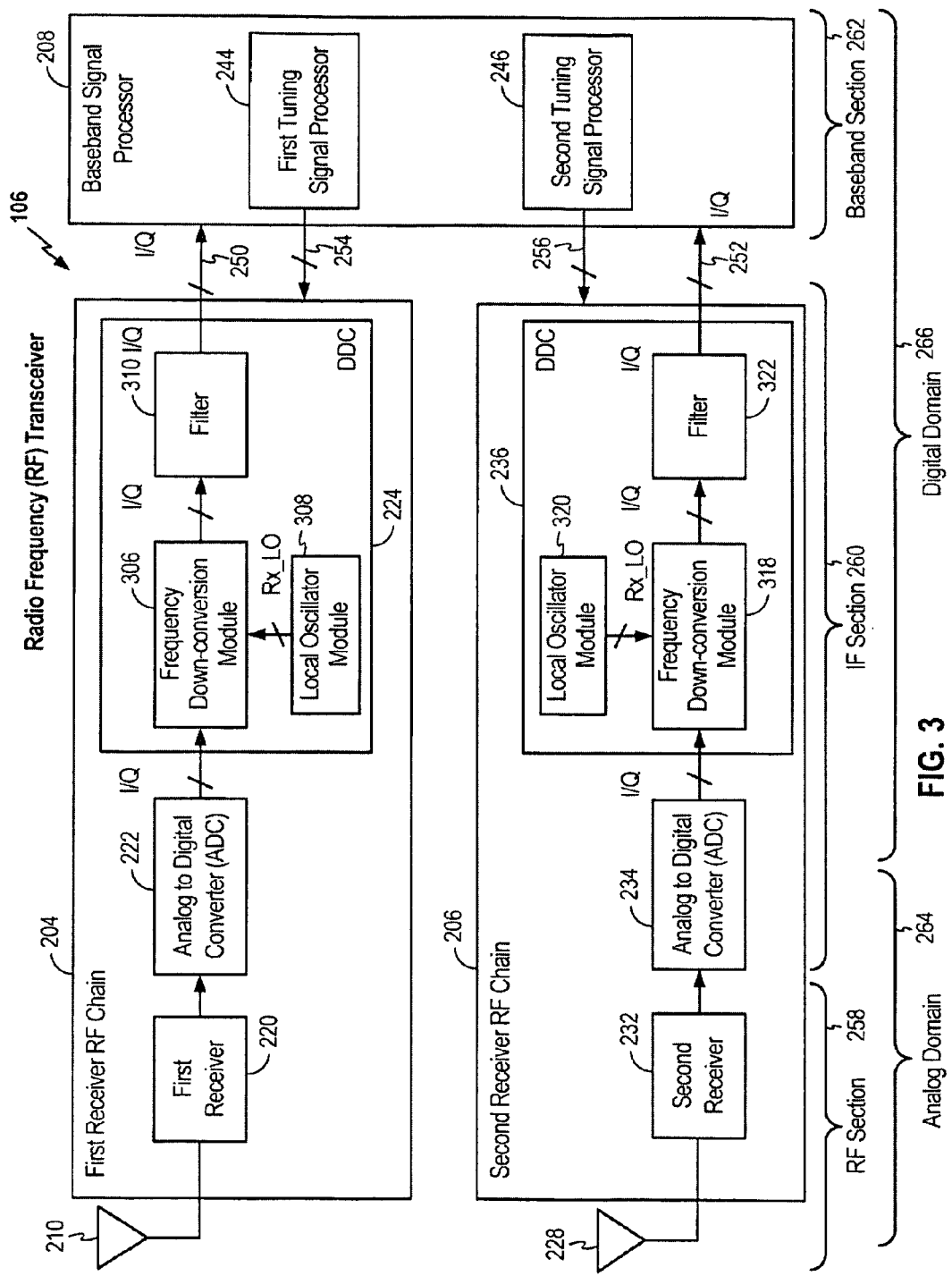
FIG. 3 illustrates an example of a block diagram representation of the radio frequency (RF) transceiver, showing additional detail of the first receiver RF chain and the second receiver RF chain, as shown in FIG. 2.

FIG. 3 illustrates an example of a block diagram representation of the RF transceiver, showing additional detail of the first receiver RF chain 204 and the second receiver RF chain 206.

In the first receiver RF chain 204, the first receiver 220 generally includes a filter and a low noise amplifier (LNA) (not shown). The first DDC 224 generally includes a frequency down conversion module 306, a local oscillator module 308, a filter 310, and a gain controller (not shown). Other elements, known within conventional receiver RF chains may be included.

In the second receiver RF chain 206, the second receiver 232 generally includes a filter and a low noise amplifier (LNA) (not shown). The DDC 236 generally includes a frequency down conversion module 318, a local oscillator module 320, a filter 322, and a gain controller (not shown). Other conventional elements, known to be employed with conventional receiver RF chains, may be included in the first 204 and second 204 receiver RF chains.

The local oscillator modules 308 and 320 each generate one or more LO signals for the first 204 and the second 206 receiver chains, as well as for the first transmitter rf chain 202. The local oscillator modules 308 and 320 each include a voltage controlled oscillator (VCO), a divider, a reference oscillator, a local oscillator (LO) buffer, and low pass filters. The VCO generates positive and negative VCO signals, as is well known to those skilled in the art of VCO design. The divider divides the positive and negative VCO signals, as is well known to those skilled in the art of divider designs.

Each of the first 204 and the second 206 receiver RF chains, and the first transmitter rf chain 202, may process, provide, or generate one or more pairs of digital signals, such as in-phase ("I") and quadrature-phase ("Q") signals, as is well known to those skilled in the art of digital RF transceiver design.

Aspects of the present invention relate to providing the first 254 and second 256 tuning signals to various elements within the first 204 and second 206 receiver RF chains to permit multiplexing the first 250 and the second 252 signals received over the first 204 and second 206 receiver RF chains for processing by the first 238, second 240, and third 242 signal processors, as further described herein.

Examples of elements that may be tuned include the local oscillator modules 308 and the filter 310 in the first receiver RF chain 204, and the local oscillator modules 320 and the filter 322 in the second receiver RE chain 206.

In one example, the filters 310 and 322 are digital filters. Tuning these digital filters 310 and 322 involves adjusting their parameters, including for example, their timing and state information. Each of the digital filters 310 and 322 may also have a predetermined and known state, described by their timing and state information, for example, that may be quickly reset by a reset signal provided by the first 244 and the second 246 tuning signal processors, respectively.

In another example, a group delay attributed to all of the elements in the first 204 and/or second 206 receiver RF chains should stay constant during the multiplexing (i.e., switching) of the modes and/or signals. Maintaining a constant group delay implies that the second RF front end 230 and the digital filter 322 of the second receiver RF chain 206, for example, are designed in a way so that these elements can be switched quickly back and forth (i.e., multiplexed) between multiple modes of operations. When these elements are switched to the GPS mode, their timing and phase is deterministically aligned to the GPS timing (e.g., the real time clock 406 in FIG. 4) in the baseband signal processor 208. In some cases, changes in the group delay between the first 204 and the second 206 receiver RF chains, due to multiplexing, may be accommodated in downstream signal processing in the baseband signal processor 208.

In another example, frequency error does not drift during the switching operation. When the RF chain is removed from the GPS mode, a voltage controlled oscillator (VCO) (e.g., in the local oscillator module 320), and any reference clock sources for the VCO, are not disturbed.

Figure 4:
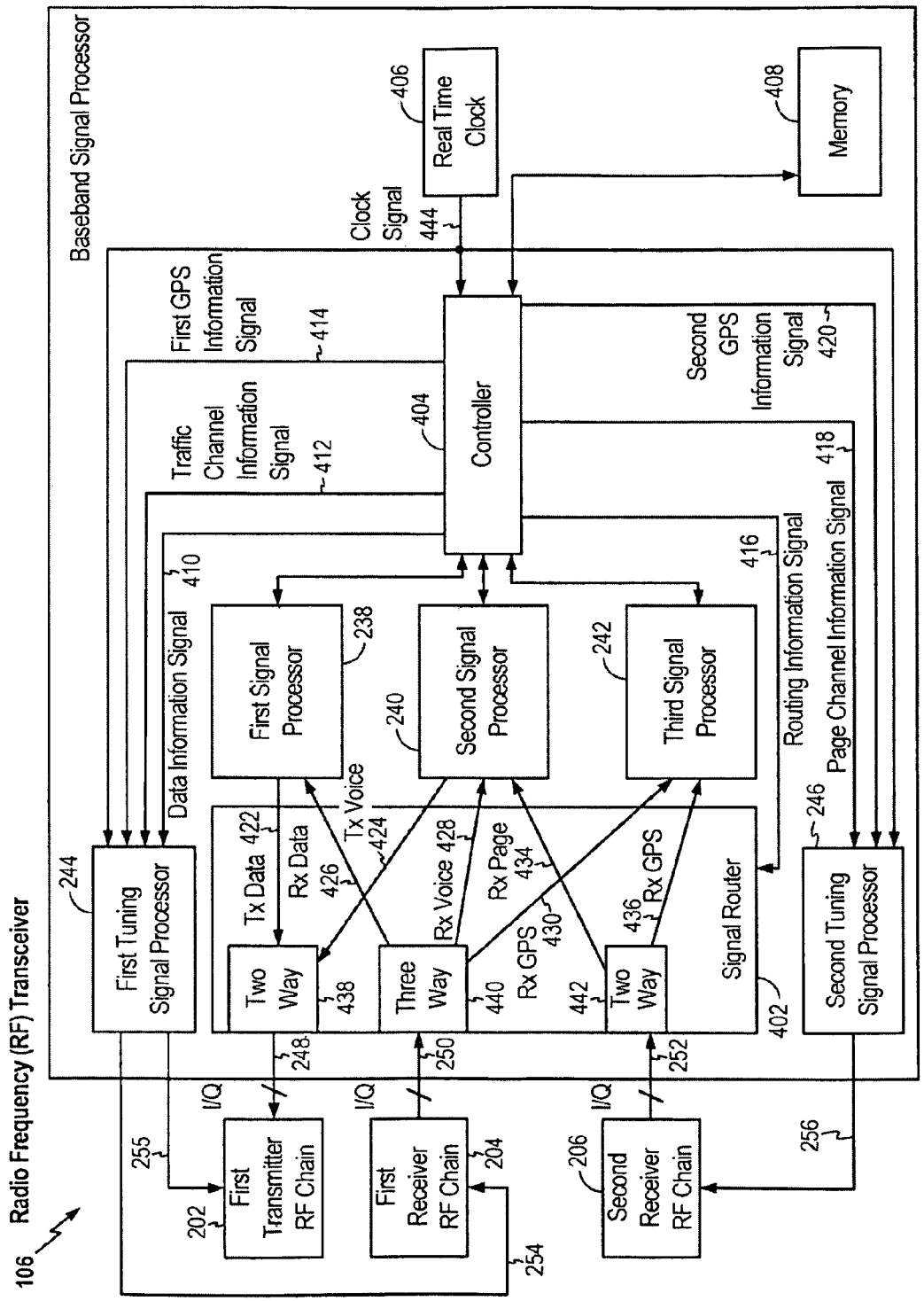
FIG. 4 illustrates an example of a block diagram representation of the RF transceiver, showing additional detail of the baseband signal processor.

FIG. 4 illustrates an example of a block diagram representation of the RF transceiver 106, showing additional detail of the baseband signal processor 208.

The baseband signal processor 208 further includes a signal router 402, a controller 404, a real time clock 406, and a memory 408. Other conventional elements, known to be employed with conventional baseband signal processors, may be included in the baseband signal processor 208.

The controller 404 provides a data information signal 410, a traffic channel information signal 412, a first GPS information signal 414 for the first tuning signal processor 244, according to a method represented by computer instructions stored in the memory 408, and described herein. The controller 404 provides a routing information signal 416, a page channel information signal 418, and a second GPS information signal 420 for the second tuning signal processor 246, according to a method represented by computer instructions stored in the memory 408, and described herein.

The real time clock 406 provides a real time clock signal 444 for the controller 404, and the first 244 and the second 246 tuning signal processors. The real time clock signal 444 provides an accurate local timing reference to permit the first and the second receiver RF chains to accurately receive over time multiplexed signals, represented by the first 250 and the second 252 signals. The real time clock signal 444 also provides an accurate local timing reference to permit the first 238, the second 240, and the third 242 signal processors to accurately process over time multiplexed signals, represented by the first 250 and the second 252 receive signals, as well as to accurately process over time the transmit signals 248 without introducing unpredictable digital delays.

The real time clock 406 supports a synchronous sampling scheme wherein a sample clock signal is offset from a sample count by a fixed amount of time, as determined by the design of the system. When a receiver is tuned to the GPS mode, the sample clock is synchronized to the sample counter transition points. The sample counter is left un-perturbed during the entire tune-away operation, and unpredictable or uncertain digital delays are not introduced in the receiver.

A memory 408 provides a source and/or destination of stored instructions, such as computer readable instructions, representing methods or processes, and/or data for used by the baseband signal processor 208 and/or the controller 404, as is well known to those skilled in the art of RF transceiver design.

The signal router 402 generally includes a first two way signal router 438, a three way signal router 440, and a second two way signal router 442. The signal router 402 generally routes signals between one or more of the first 238, the second 240, and the third 242 signal processors, and one or more of the first transmitter RF chain 202, the first receiver RF chain 204, and the second receiver RF chain 206. The signal router 402 may be implemented as any device that routes signals, including for example, a signal multiplexer, one or more switches, a signal controller, etc. Further, for example, an erasure signal may be used as an input to a multiplexer to provide a noise signal to prevent a signal processor from receiving a strong signal.

The first two way signal router 438 selectively routes a transmit data signal 422 from the first signal processor 238 or a transmit voice signal from the second signal processor 240 to the first transmitter RF chain 202, represented as the transmit signal 248.

The three way signal router 440 selectively routes the first receive signal 250, represented as one of a receive data signal 426, a receive voice signal 428, and a receive GPS signal 430, from the first receiver RF chain 204 to one of the first 238, the second 240, and the third 242 processors, respectively.

The second two way signal router 442 selectively routes the second receive signal 252, represented as one of a receive cellular page signal 434 and a receive GPS signal 436, from the first receiver RF chain 204 to one of the second 240 and the third 242 processors, respectively.

Various aspects of the present invention related to providing, timing, routing, and controlling, etc. the various signals and elements shown in FIG. 4 are described further herein.

Figure 5:
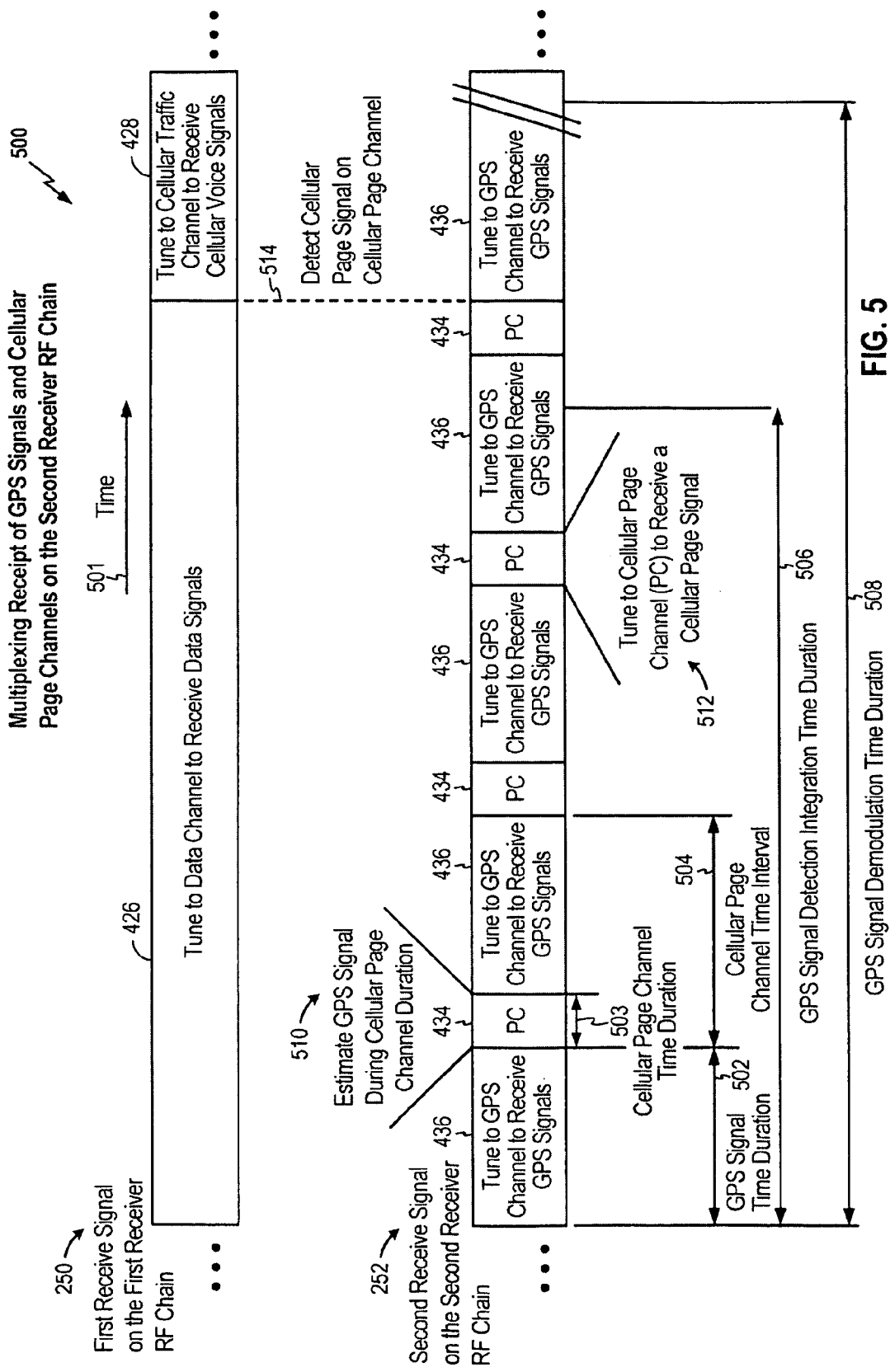
FIG. 5 illustrates an example of a signal diagram representation for the RF transceiver, multiplexing a global positioning system (GPS) signal and a cellular paging signal on the second receiver RF chain.

FIG. 5 illustrates an example of a signal diagram representation 500 for the RF transceiver 106 multiplexing a GPS signal 436 and a cellular paging signal 434 on the second receiver RF chain 206. The signal diagram includes a first receive signal 250 received by the first receive RF chain 204, and a second receive signal 252 received by the second receive RF chain 206. Each of the signals 250 and 252 are referenced to and move forward with time 501.

The first receive RF chain 204 is tuned to a data channel for a time duration to permit the receipt of the data signals 426. Then, the first receive RF chain 204 is tuned to a cellular traffic channel to receive cellular voice signals 428 for a time duration, in response to detecting receipt and processing of a cellular page signal 434 on a cellular page channel on the second receiver RF chain 206.

The second receive RF chain 206 is tuned to a GPS channel for a GPS signal time duration 502 to permit the receipt of the GPS signals 436. Then the second receive RF chain 206 is tuned 512 to a cellular page channel for a cellular page channel time duration 503 to permit receipt of the cellular page signal 434, if present on the cellular page channel. The second receive RF chain 206 continues to be alternately tuned to the GPS channel and to the cellular page channel to permit the receipt of the GPS signals 436 and the cellular page signal 434, respectively.

The cellular page channel time duration 503 is typically specified by an air interface standard, and for WCDMA, for example, may be 50 to 200 msec. long. The cellular page channel time duration 503 may be fixed among all cellular page channel time durations. Alternatively, the cellular page channel time duration 503 may vary among different cellular page channel time durations 503 depending on various conditions, for example, channel conditions.

The RF transceiver 106 monitors the cellular page channel time durations 503 for a cellular page signal sent from the first RF (e.g., cellular) communication system 102. When the RF transceiver 106 detects that a cellular page signal has been received on the second receiver RF chain 206, as represented by reference number 514, the RF transceiver 106 responds to the page by transmitting an acknowledgement signal via the first transmitter RF chain 202 to the first RF (e.g., cellular) communication system 102. Thereafter, the first receiver RF chain 204 is tuned to the cellular traffic channel to receive cellular voice signals, and the first transmitter RF chain 202 is tuned to the cellular traffic channel to transmit cellular voice signals.

A cellular page channel time interval 504 is typically specified by an air interface standard, and for WCDMA, for example, may be 2.56 to 5.12 seconds long, and may vary depending on various conditions, for example, different carrier options.

A GPS signal detection integration time duration 506 is typically specified by an air interface standard, and for WCDMA, for example, may be 10 msec. to 12 seconds long, and may vary depending on various conditions, for example, different environmental conditions. For example, GPS signal detection integration time duration 506 outside a building may be 1.0 second (i.e., due to relatively strong GPS signals reception requiring a shallow acquisition for a more sensitive receiver), and inside a building may be 12 seconds (i.e., due to relatively weak GPS signals reception requiring a deep acquisition for a less sensitive receiver). Further, for example, the GPS signal detection integration time duration 506 may be defined by heuristic scheduling algorithms depending on the signal strengths of the GPS signals.

A GPS signal demodulation time duration 508 is typically set by an air interface standard, and for WCMDA, for example, may be 30 to 60 seconds long, and may vary depending on various conditions, for example, different signal, environmental, and receiver conditions.

When comparing various typical time durations and intervals for an air interface standard, such as WCDMA, for example, the 2.56 to 5.12 seconds long for the cellular page channel time interval 504, having a relatively low duty cycle, may occur two or more times during the 10 msec. to 12 seconds long GPS signal detection integration time duration 506, under some signal conditions, and multiple times during the 30 to 60 seconds long GPS signal demodulation time duration 508.

The 50 to 200 msec. long cellular page channel time duration 503 is a relatively short time compared to the cellular page channel time interval 504 of 2.56 to 5.12 seconds long, the GPS signal detection integration time duration 506 of 10 msec. to 12 seconds long, and the GPS signal demodulation time duration 508 of 30 to 60 seconds long. The cellular page channel time duration 503 may also be referred to as a "blank" or "blanking" time during the receipt of the GPS signal 436 because the GPS signal is not received during the time duration 503 on the second receiver RF chain 206.

Generally, the GPS signal detection integration time duration 506 and the GPS signal demodulation time duration 508 are relatively long durations because the GPS signal has a relatively low signal to noise (SNR) ratio. Disrupting or reducing a contiguous reception of a GPS signal over a receiver RF chain (e.g., due to "blanking") may degrade the sensitivity and limit the demodulation capability of a GPS receiver. Because signal propagation delay contains GPS "position information," any uncertainty introduced in the reception and processing of the GPS signal is interpreted as measurement noise, which affects the accuracy of the position calculation of the GPS receiver.

Various approaches may be employed to permit timely and quality receipt and processing of the GPS signals, without reducing receiver sensitivity, while the received GPS signals are periodically interrupted to tune to the cellular page channel to monitor and receive, if present, the cellular page signal 434 on the cellular page channel. The various approaches address the interruption of the GPS signals 436 in ways to reduce the loss of sensitivity in the second RF receiver chain 206 due to such interruptions. The RF transceiver provides that a single RF chain is shared between GPS operations and paging channel operations. The paging channel operations may be paging channel operations for one or more air interface standards or technologies, including, for example, cellular technology such as 1x, EVDO, GSM, WCDMA, etc.

A first approach is to treat the blank time of the cellular page channel time duration 503 during the receipt of the GPS signal 436 as a temporary, short term fade in the GPS signal 436. In this approach, the relatively short 50 to 200 msec. long cellular page channel time duration 503 at the cellular page channel time interval 504 should not have a noticeable effect on the timely and quality receipt and processing of the GPS signals 436 over relatively long GPS signal detection integration time duration 506 or the relatively long GPS signal demodulation time duration 508. The GPS signals 436 are expected to experience a fade of up to 200 to 300 milliseconds, without any appreciable detrimental effect on the timing and the quality of the received GPS signals 436.

A second approach is to determine an estimate, guess, or projection 510 of the GPS signal 436 during the cellular page channel time duration 503. Since the cellular page channel time duration 503 is a relatively short time compared to the GPS signal detection integration time duration 506 or the relatively long GPS signal demodulation time duration 508, the GPS signal estimate 510 should be a reasonable estimate. The second approach may be considered to be an improvement over the temporary, short term fade approach because GPS signal estimate 510 is processed, rather than processing a blank (i.e., not any signal), during the cellular page channel time duration 503.

In each of the temporary, short term fade approach and the GPS signal estimate, the third signal processor 242 processes the fade or the GPS signal estimate during the cellular page channel time duration 503 together with the received GPS signals 436 to provide a restored (i.e., integrated over time) GPS signal, with timeliness and quality, and without any apparent interruption of the receipt of the GPS signal 436 due to the cellular page channel time duration 503. These approaches are appropriate when data on the primary channel cannot be interrupted. For example, voice over IP, or multimedia applications, such as video conferences should not be interrupted.

Figure 6:
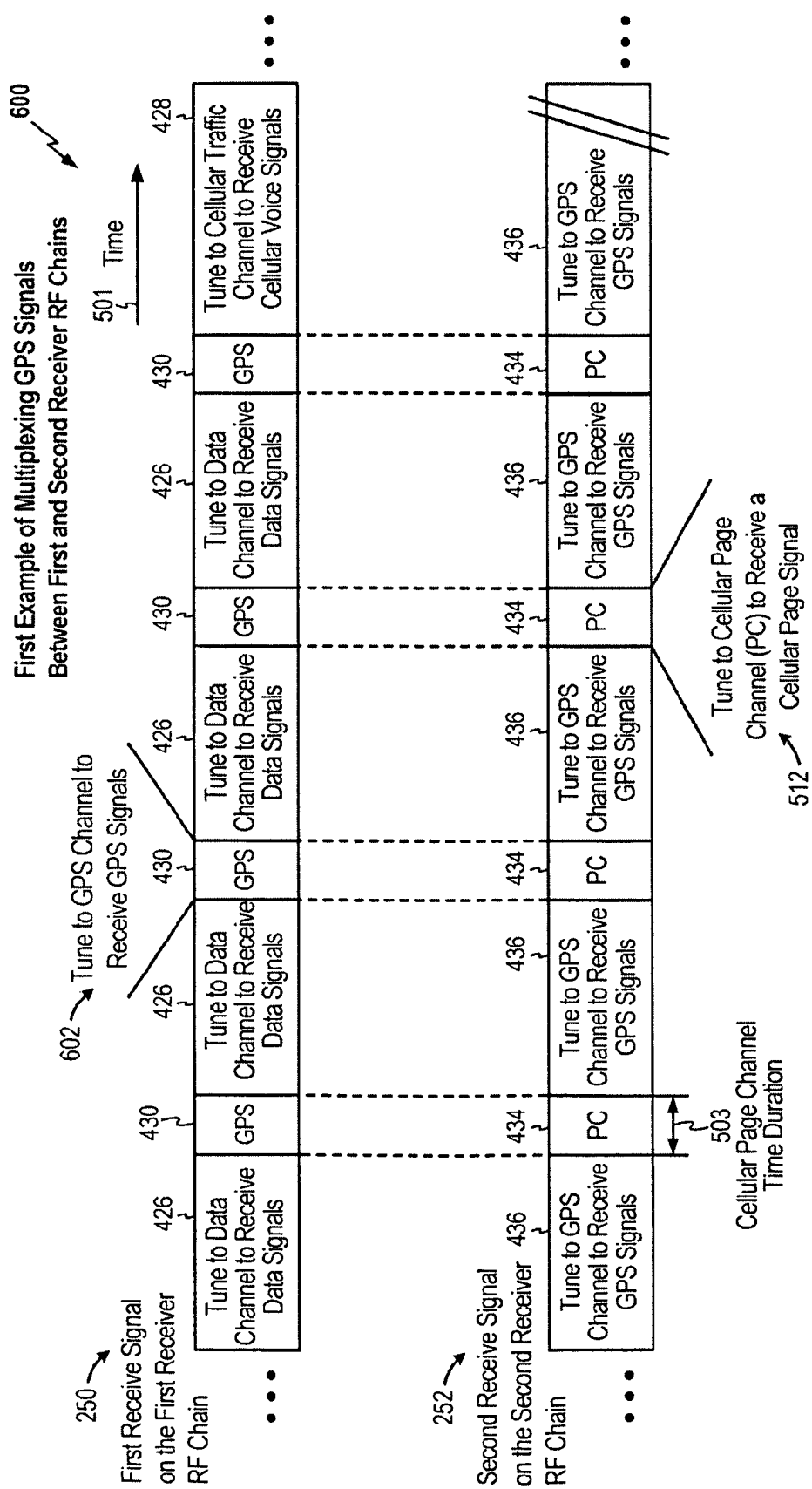
FIG. 6 illustrates a first example of a signal diagram representation for the RF transceiver, multiplexing the receipt of a GPS signal between the first receiver RF chain and the second receiver RF chain.

FIG. 6 illustrates a first example of a signal diagram representation 600 for the RF transceiver 106, multiplexing the receipt of a GPS signal between the first receiver RF chain and the second receiver RF chain.

When the data on the primary channel can be interrupted, a third approach receives an actual GPS signal 430 on the first receiver RF chain 204 when the GPS signal 436 is being blanked out on the second receiver RF chain 206 during the cellular page channel time duration 503. In this approach, the entire, actual, contiguous GPS signal is received over time by multiplexing the GPS signal between the first receiver RF chain 204 and the second receiver RF chain 206. The term "multiplexing" may be characterized, for example, as "switching back and forth between the two chains 204 and 206 real fast." In one embodiment, the switching occurs within a few microseconds.

In operation, the second receiver RF chain 206 is tuned to the GPS channel to receive the GPS signal 436. During the cellular page channel time duration 503 on the second receiver RF chain 206, the first receiver RF chain 204 is tuned to the GPS channel to receive the GPS signal 430. In this case, the GPS signals 430 and 436 are segments of the same actual, contiguous GPS signal received over time, but are received on the first 204 and second 206 receiver RF chains, respectively, at two different, adjacent, and contiguous times.

The first receiver RF chain 204 may be tuned, at time 602, to the GPS channel to receive the GPS signal 430 because the first receiver RF chain 204 is receiving interruptible data signals 426, and is not tuned to a cellular traffic channel to receive cellular voice signals 428 (i.e., no cellular page signal has been received, detected, and processed yet on the second receiver RF chain 206). A characteristic of the data signals 426 is that the timing of their receipt may be somewhat flexible over time to yield (i.e., stop being received) to a priority of receiving the actual GPS signals 430 in a timely manner, or to yield to a priority of receiving the cellular voice signals 428. The data signals 426 may be stopped simply by storing the data signals at the first (e.g., cellular) RF communication system 102, until the first receiver RF chain 204 is available to receive the data signals.

As with the first and second approaches, the third signal processor 242 processes the actual GPS signal 430 from the first receiver RF chain during the cellular page channel time duration 503 together with the received GPS signals 436 received from the second receiver RF chain to provide a reconstituted GPS signal, with contiguous timeliness and quality, and without any apparent interruption of the receipt of the GPS signal 436 due to the cellular page channel time duration 503.

In the signal diagram 600 of FIG. 6, the time duration for tuning to the GPS channel to receive the GPS signal 430 on the first receiver RF chain 204 corresponds to and aligns in time with a beginning and an end the cellular page channel time duration 503 on the second receiver RF chain 206. In this case, there is no overlap of the two corresponding times. An advantage of having no overlap in time includes reducing the time duration that the GPS signal 430 is received on the first receiver RF chain 204. If there is some delay between the first 204 and second 206 receiver RF chains, however, having no overlap in time may result in some bits of the GPS signal 430 received from the first receiver RF chain 204 being lost and not available for processing. The potential lost bits of the GPS signal 430 may be preserved by yet a fourth approach described with reference to FIG. 7.

Figure 7:
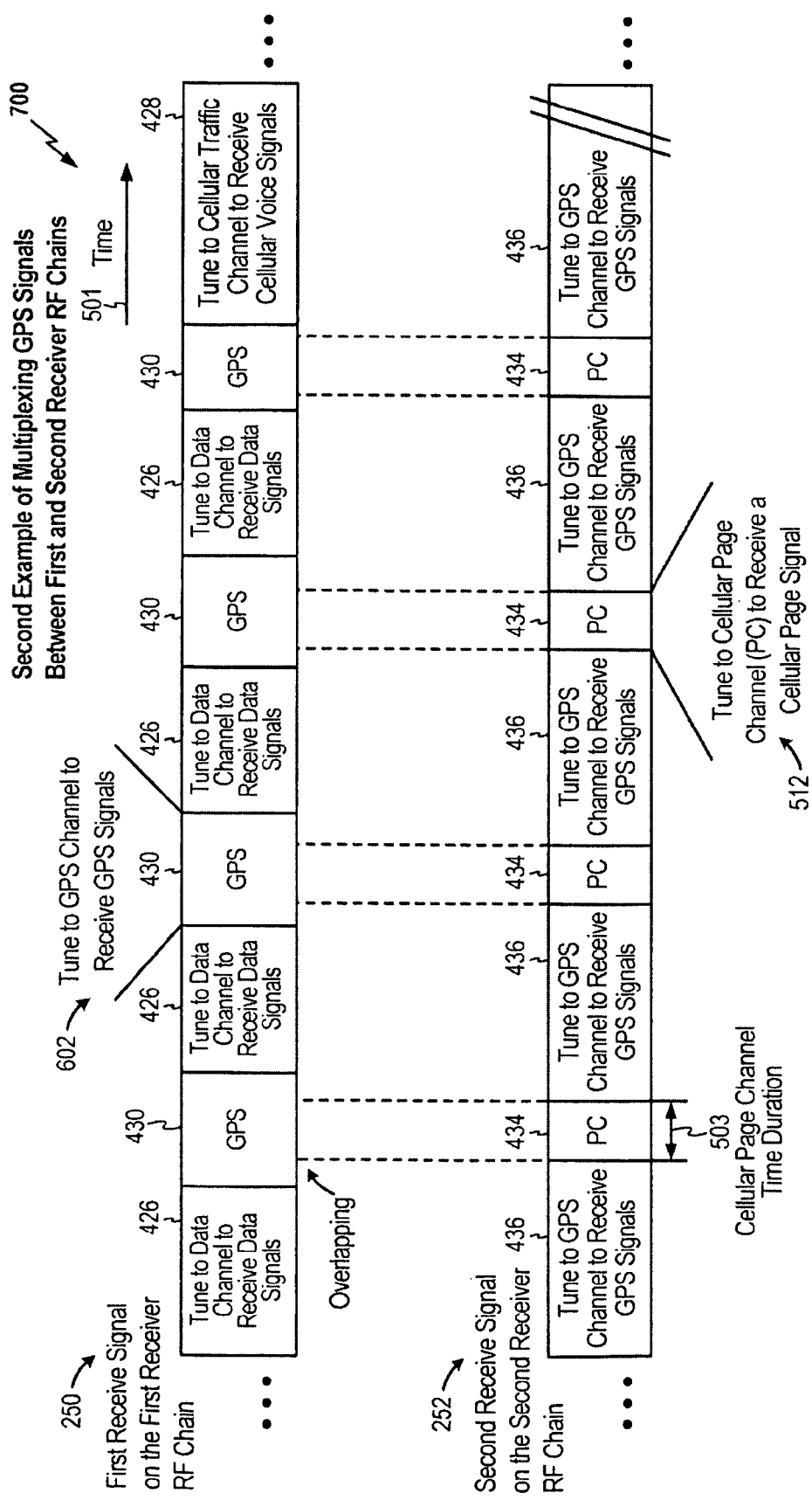
FIG. 7 illustrates a second example of a signal diagram representation for the RF transceiver, multiplexing the receipt of a GPS signal between the first receiver RF chain and the second receiver RF chain.

FIG. 7 illustrates a second example of a signal diagram representation 700 for the RF transceiver 106 multiplexing the receipt of a GPS signal between the first receiver RF chain 204 and the second receiver RF chain 206. This example is also appropriate when the data signals can be interrupted.

In the fourth approach, the time duration for tuning to the GPS channel to receive the GPS signal 430 on the first receiver RF chain 204 overlaps in time with a beginning and/or an end of the cellular page channel time duration 503 on the second receiver RF chain 206. In this case, there is an overlap of the two corresponding times. The overlapping time condition may be referred to as "make before break." The time remaining on the first receiver RF chain 204 to receive the data signals 426 is reduced as a result of the overlap, but again due to the secondary priority of the data signals, the effect on the data signals should continue to be inconsequential.

An advantage of having the overlap in time, includes receiving and processing all of the bits of the GPS signal in both paths, thereby resulting in no data bit errors, even if there is some delay (e.g., due to fractional carrier phase difference) between the first 204 and second 206 receiver RF chains. In other words, the GPS signal 430 received on the first receiver RF chain 204 can be analyzed to estimate the fractional carrier phase difference relative to the GPS signal 436 received on the second receiver RF chain 206 during the overlapping time. Similarly, when returning to the GPS signal 436, prior to using the GPS signal 436 (i.e., during the overlap) the GPS signal 436 is analyzed to estimate the fractional carrier phase difference relative to the GPS signal 430 received on the first receiver RF chain 204. The estimated fractional carrier phase differences are accounted for to avoid (or reduce) demodulation errors when reconstituting a GPS signal from the GPS signals 430, 436 of both paths. The reconstituted GPS signal is a substantially complete GPS signal in one embodiment, and a complete GPS signal in another embodiment.

Figure 8:
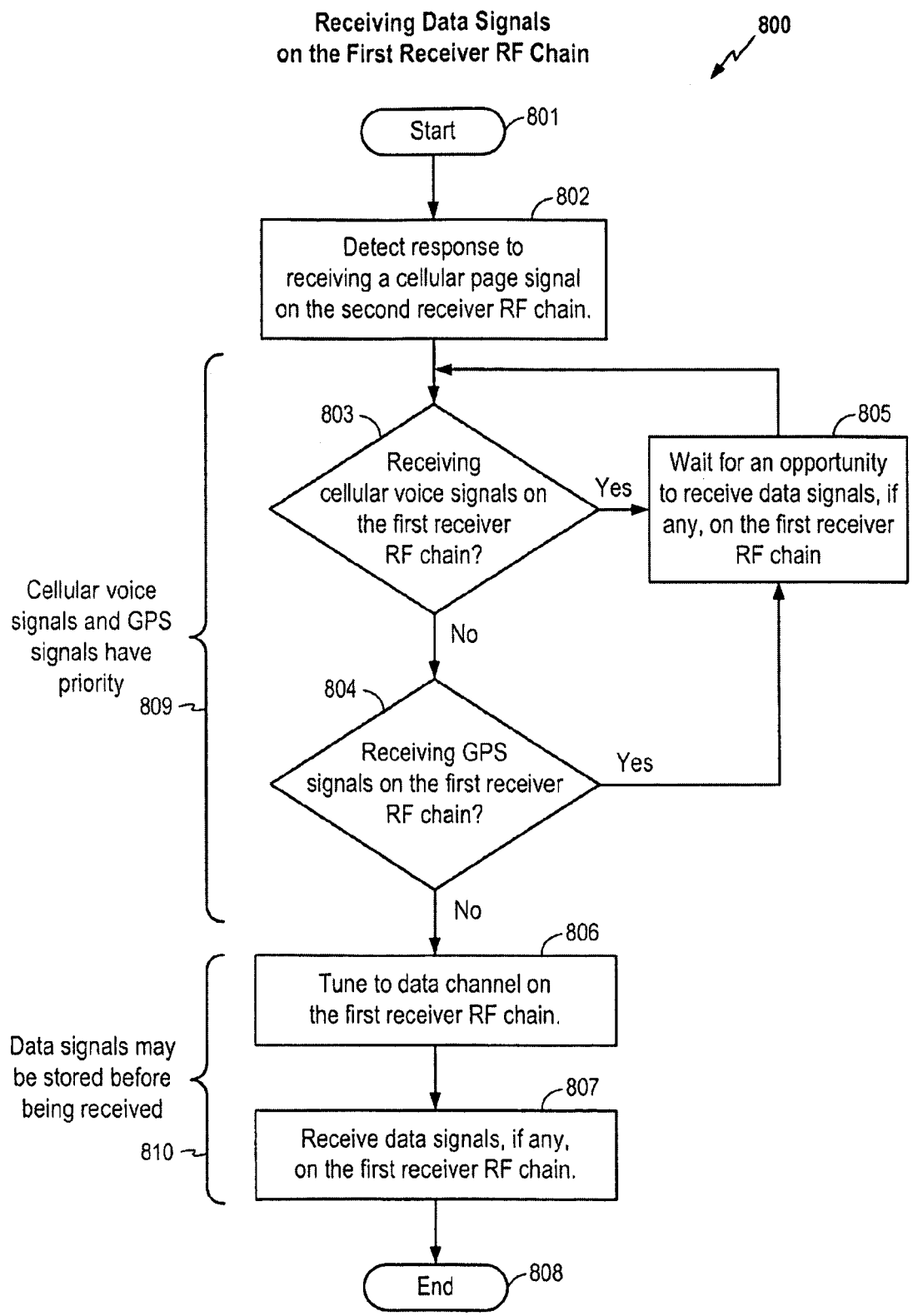
FIG. 8 illustrates an example of method for receiving data signals on the first receiver RF chain.

FIG. 8 illustrates an example of a method 800 for receiving data signals on the first receiver RF chain 204.

At block 801, the method 800 starts.

At block 802, the RF transceiver 106 detects a response to receiving the cellular page signal 434 on the second receiver RF chain 206. Typically, the cellular page signal 434 is received and processed (i.e., acquired, decoded, demodulated, etc.) by the second (i.e., cellular) signal processor 240. The controller 404 detects the receipt and processing of the cellular page signal 434 and generates the response.

At block 803, the RF transceiver 106 determines whether the RF transceiver needs to receive or is receiving cellular voice signals 428 on the first receiver RF chain 204. Such a determination is typically made by the controller 404 in response to receiving, detecting, and processing a cellular page signal by the second signal processor 240 (see FIG. 4). If the determination at block 803 is positive, the method 800 continues to block 805. If the determination at block 803 is negative, the method 800 continues to block 804.

At block 804, the RF transceiver 106 determines whether the RF transceiver 106 needs to receive or continue to receive the GPS signal. Such a determination is typically made by the controller 404 in response to information received from the third signal processor 242, the clock signal 444, and GPS information retrieved from the memory 408 (see FIG. 4). If the determination at block 804 is positive, the method 800 continues to block 805. If the determination at block 804 is negative, the method 800 continues to block 806.

As noted by reference number 809, the receipt of a cellular voice signal 428 at block 803 and/or the receipt of the GPS signal at block 804, each have priority over the receipt of the data signal 426 on the first receiver RF chain 204.

At block 805, the RF transceiver 106 waits for an opportunity to receive the data signals 426, if any, on the first receiver RF chain 204. While waiting, the RF transceiver 106 may be receiving the cellular voice signal 428 over a cellular traffic channel on the first receiver RF chain 204, or may be receiving the GPS signal 430 over the GPS channel on the first receiver RF chain 204. The first tuning signal processor 244 tunes the first receiver RF chain to the traffic channel in response to a traffic channel information signal provided by the controller 404, or to the OPS channel in response to the first GPS information signal 414 provided by the controller 404. After block 805, the method 800 returns back to block 803, and block 804, until the RF transceiver 106 does not need to receive or is no longer receiving the cellular voice signal 428 or the GPS signal 430.

At block 806, the RF transceiver 106 tunes to a data channel on the first receiver RF chain 204. The first tuning signal processor 244 tunes the first receiver RF chain 204 to the data channel in response to the data information signal 410 provided by the controller 404.

At block 807, the RF transceiver 106 receives the data signal 426, if present, on the first receiver RF chain 204. The first signal processor 238 processes the received data signal 426, which may include, for example, decoding, despreading, converting to text or audio, etc. As noted by reference number 810, the data signal 426 may be stored in the first (e.g., cellular) RF communication system 102 before being received on the first receiver RF chain 204.

At block 808, the method 800 ends.

Figure 9:
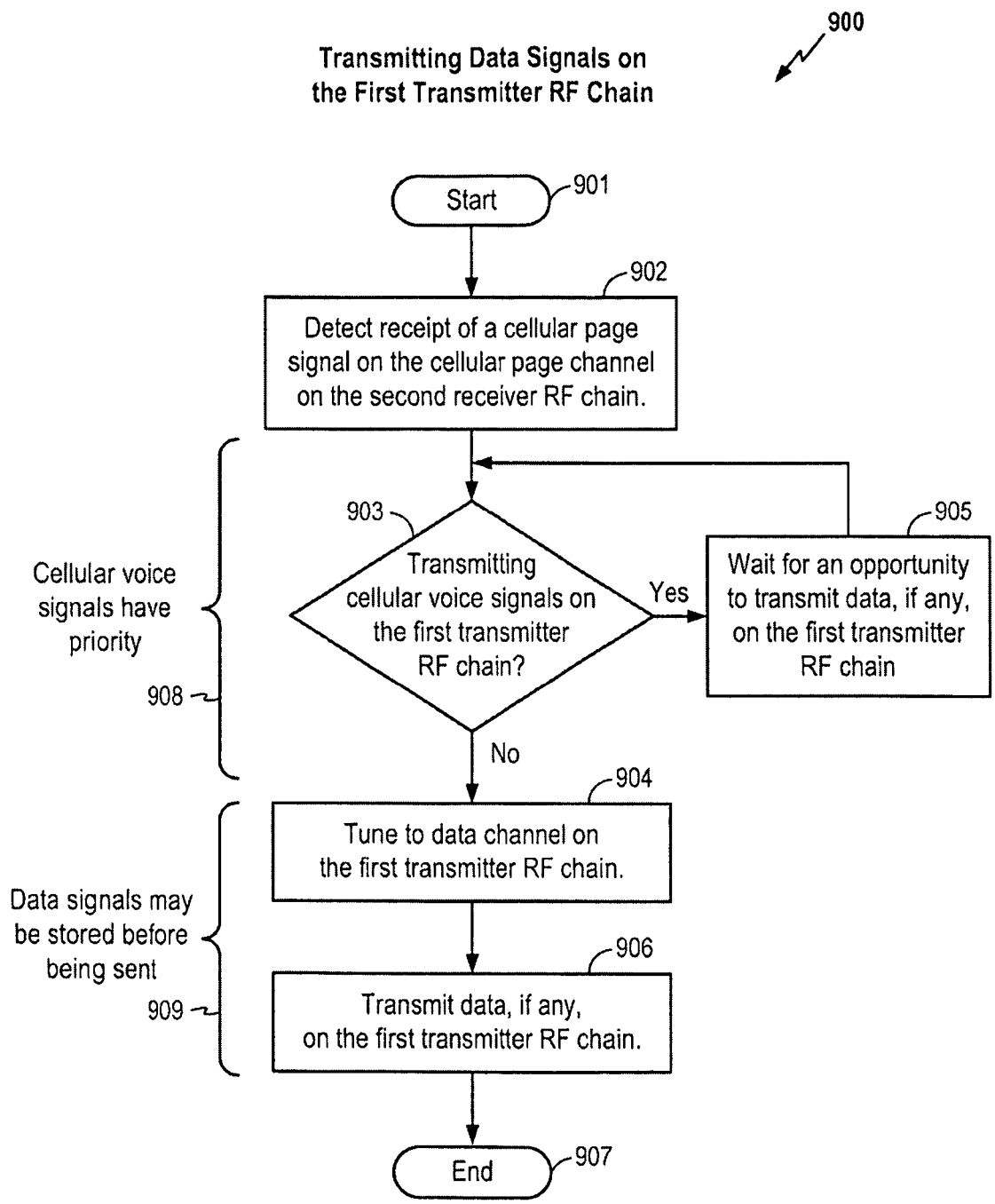
FIG. 9 illustrates an example of a method for transmitting data signals on the first transmitter RF chain.

FIG. 9 illustrates an example of a method 900 for transmitting data signals 422 on the first transmitter RF chain 202.

At block 901, the method 900 starts.

At block 902, the RF transceiver 106 detects receipt of the cellular page signal 434 on the cellular page channel on the second receiver RF chain 206. Typically, the second signal processor 240 receives and processes (e.g., acquires, decodes, demodulates, etc.) the cellular page signal 434. This detection activity at block 902 may not be needed for transmitting the data signal 422, depending on how the communication system 100 is designed. If the RF transceiver 106 is permitted to transmit only after the receipt of the cellular page signal 434, then the activity at block 902 is needed. If the RF transceiver is permitted to transmit without first receiving the cellular page signal 434, then the activity at block 902 may not needed.

At block 903, the RF transceiver 106 determines whether the RF transceiver needs to transmit or is transmitting a cellular voice signal 424 on the first transmitter RF chain 202. Such a determination is typically made by the controller 404 in response to receiving and processing (e.g., acquiring, detecting, demodulating, etc.) a cellular page signal by the second signal processor 240, or by the second signal processor 240 having a cellular voice signal 424 to transmit or that is transmitting (see FIG. 4). If the determination at block 903 is positive, the method 900 continues to block 905. If the determination at block 903 is negative, the method 900 continues to block 904. As noted by reference number 908, the transmission of a cellular voice signal 424 at block 903 has priority over the transmission of the data signal 422 on the first transmitter RF chain 202.

At block 904, the RF transceiver 106 tunes the first transmitter RF chain 202 to the data channel. At block 905, the RF transceiver 106 waits for an opportunity to transmit the data signal 422, if any, on the first transmitter RF chain 202. While waiting, the RF transceiver 106 may be transmitting the cellular voice signal 424 over a cellular traffic channel on the first transmitter RF chain 202. After block 905, the method 900 returns back to again make a determination at block 903, until the RF transceiver 106 does not need to transmit or is no longer transmitting the cellular voice signal 424.

At block 904, the RF transceiver 106 transmits the data signal 422, if any is present, on the first transmitter RF chain 202. As noted by reference number 909, the data signal 422 may be stored in the RF transceiver 106 (e.g., memory 408) before being transmitted on the first transmitter RF chain 202.

At block 907, the method 900 ends.

Figure 10:
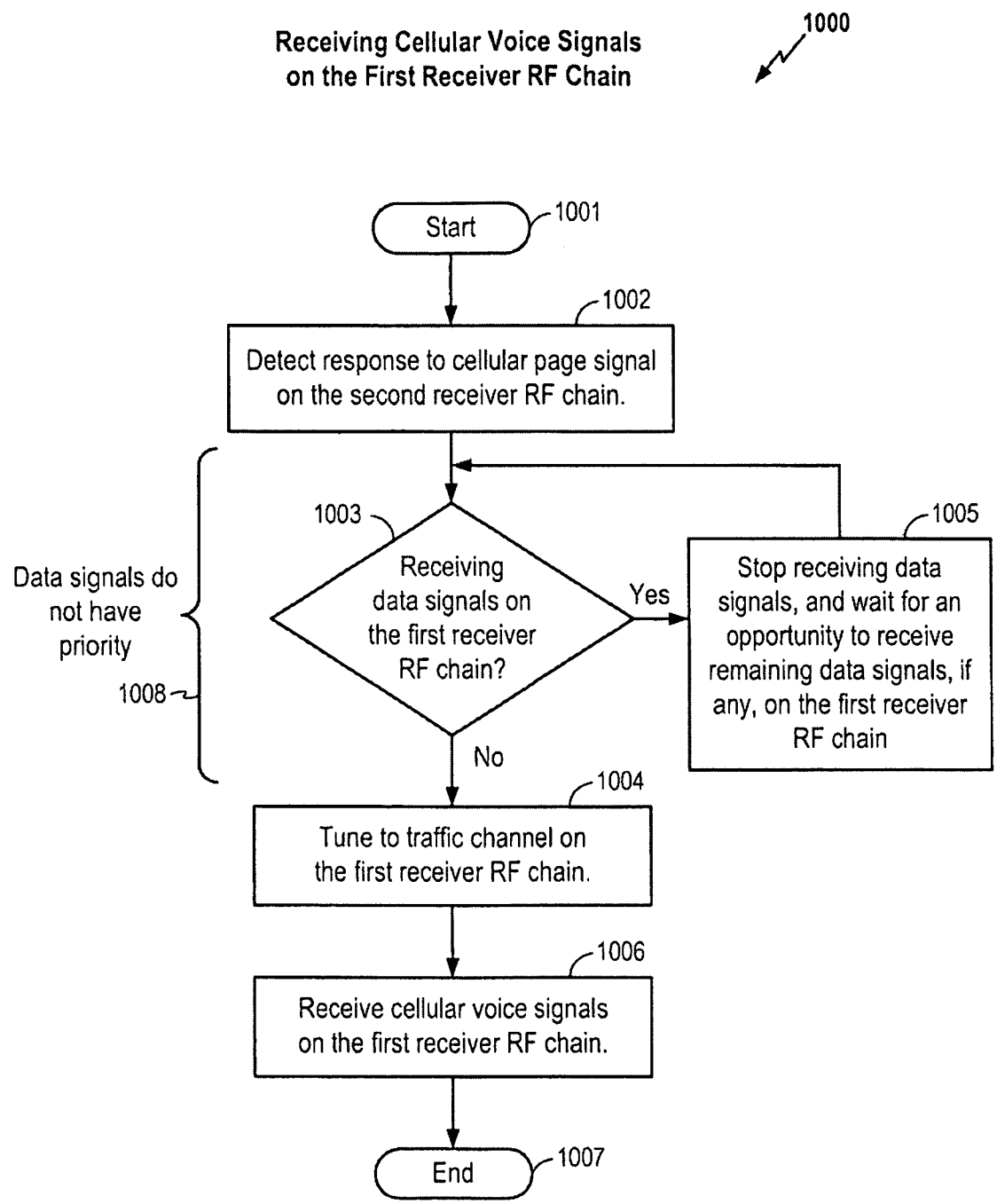
FIG. 10 illustrates an example of a method for receiving cellular voice signals on the first receiver RF chain.

FIG. 10 illustrates an example of a method 1000 for receiving cellular voice signals 428 on the first receiver RF chain 204.

At block 1001, the method 1000 begins.

At block 1002, the RF transceiver 106 detects a response to receiving the cellular page signal 434 on the second receiver RF chain 206. Typically, the cellular page signal 434 is received and processed (i.e., acquired, decoded, demodulated, etc.) by the second (i.e., cellular) signal processor 240. The controller 404 detects the receipt and processing of the cellular page signal 434 and generates the response. (see FIG. 4)

At block 1003, the RF transceiver 106 determines whether the RF transceiver 106 needs to receive or is receiving data signals 426 on the first receiver RF chain 204. Such a determination is typically made by the controller 404 in response to receiving and processing (e.g., acquire, decode, demodulate, etc.) a cellular page signal 434 by the second signal processor 240 (see FIG. 4). If the determination at block 1003 is positive, the method 1000 continues to block 1005. If the determination at block 1003 is negative, the method 1000 continues to block 1004. As noted by reference number 1008, the receipt of a cellular voice signal 428 at block 803 has priority over the receipt of the data signal 426 on the first receiver RF chain 204.

At block 1004, the RF transceiver 106 tunes to the traffic channel on the first receiver RF chain 204. The first tuning signal processor 244 tunes the first receiver RF chain 204 to the traffic channel in response to the traffic channel information signal 412 provided by the controller 404. (See FIG. 4)

At block 1005, the RF transceiver 106 stops receiving the data signals 426, and waits for an opportunity to receive the data signals, if any, on the first receiver RF chain 204. While waiting, the RF transceiver 106 may be receiving the cellular voice signal 428 over a cellular traffic channel on the first receiver RF chain 204. The first tuning signal processor 244 tunes the first receiver RF chain 204 to the traffic channel in response to a traffic channel information signal 412 provided by the controller 404. After block 1005, the method 1000 returns back to again make determinations at block 1003, until the RF transceiver 106 does not need to receive or is no longer receiving the data signals 426. The data signal 426 may be stored in the first (e.g., cellular) RF communication system 102 before being received on the first receiver RF chain 204.

At block 1006, the RF transceiver 106 receives the cellular voice signals 428, if any are present, on the first receiver RF chain 204. The second signal processor 240 processes the received cellular voice signals 428, which may include, for example, decoding, dispreading, conversion to text or audio, etc.

At block 1007, the method 1000 ends.

Figure 11:
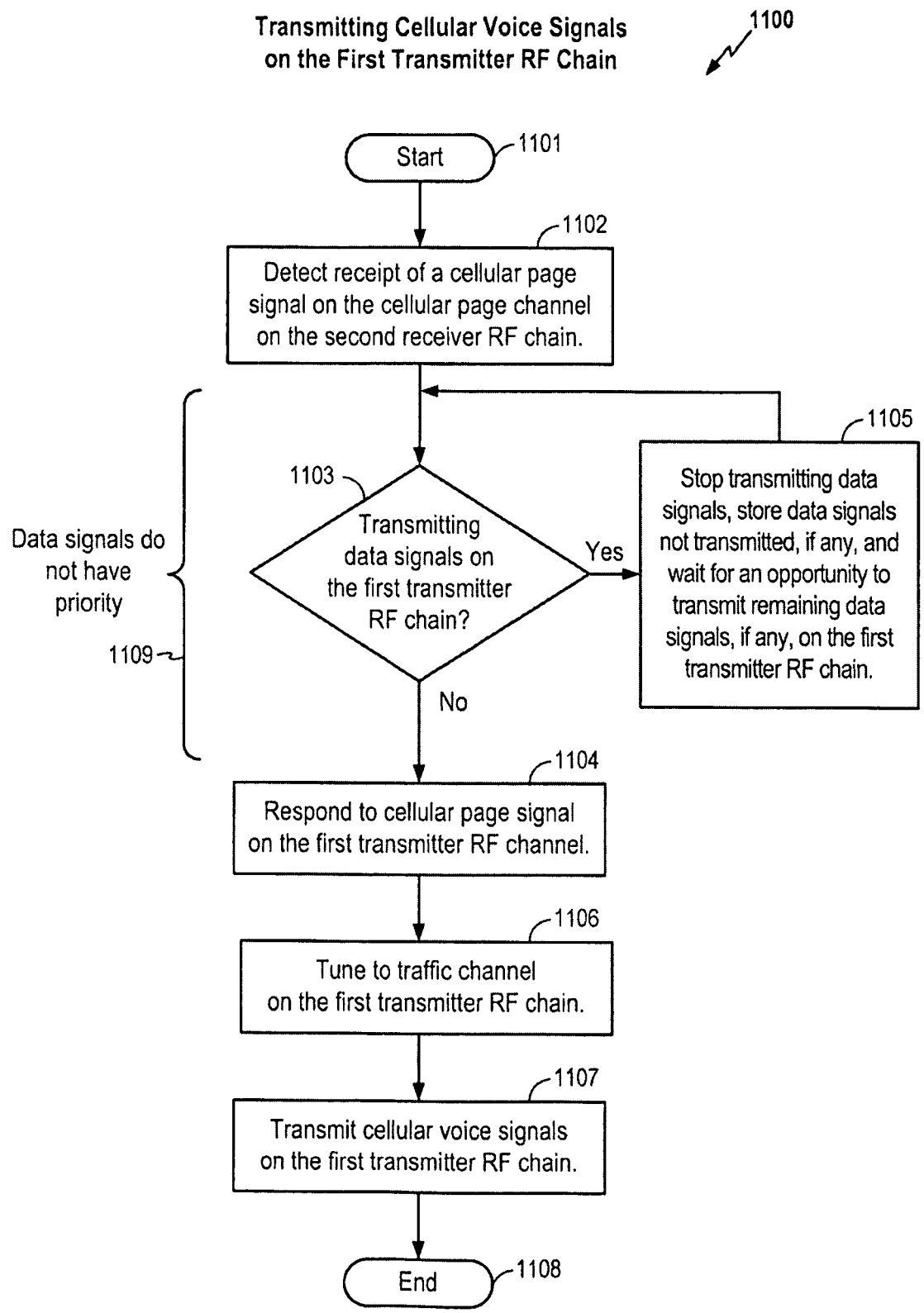
FIG. 11 illustrates an example of a method for transmitting cellular voice signals on the first transmitter RF chain.

FIG. 11 illustrates an example of a method 1100 for transmitting cellular voice signals 424 on the first transmitter RF chain 202.

At block 1101, the method 1100 begins.

At block 1102, the RF transceiver 106 detects receipt of the cellular page signal 434 on the cellular page channel on the second receiver RF chain 206. Typically, the second signal processor 240 receives and processes (e.g., acquires, decodes, demodulates, etc.) the cellular page signal 434. This detection activity at block 1002 may not be needed for transmitting the cellular voice signal 424, depending on how the communication system 100 is designed. If the RF transceiver 106 is permitted to transmit only after the receipt of the cellular page signal 434, then the activity at block 1002 is needed. If the RF transceiver 106 is permitted to transmit, without first receiving the cellular page signal 434, then the activity at block 1102 may not needed.

At block 1103, the RF transceiver 106 determines whether the RF transceiver needs to transmit or is transmitting data signals 422 on the first transmitter RF chain 202. Such a determination is typically made by the controller 404 in response to receiving and processing (e.g., acquiring, detecting, demodulating, etc.) a cellular page signal 434 by the second signal processor 240, or by the second signal processor 240 having a cellular voice signal 424 to transmit or that is transmitting. If the determination at block 1103 is positive, the method 1100 continues to block 1105. If the determination at block 1003 is negative, the method 1100 continues to block 1104. As noted by reference number 1109, the transmission of a cellular voice signal 424 at block 1003 has priority over the transmission of the data signal 422 on the first transmitter RF chain 202.

At block 1104, the RF transceiver 106 responds to the cellular page signal 434 on the first transmitter RF chain 202, if needed, as explained for block 1102. At block 1105, the RF transceiver 106 stops transmitting data signals 422, stores any data signals 422 not yet transmitted, if any, and waits for an opportunity to transmit the data signal 422, if any, on the first transmitter RF chain 202. While waiting, the RF transceiver 106 may be transmitting the cellular voice signal 424 over a cellular traffic channel. After block 1105, the method 1100 returns back to again make a determination at block 1103, until the RF transceiver 106 does not need to transmit or is no longer transmitting the data signals 422.

At block 1106, the RF transceiver 106 tunes the first transmitter RF chain 202 to the traffic channel. At block 1107, the RF transceiver 106 transmits the cellular voice signals 424, if any is present, on the first transmitter RF chain 202. Typically, such transmission is provided by the second signal processor 240 in response to the controller 404. (See FIG. 4)

At block 1108, the method 1100 ends.

Figure 12:
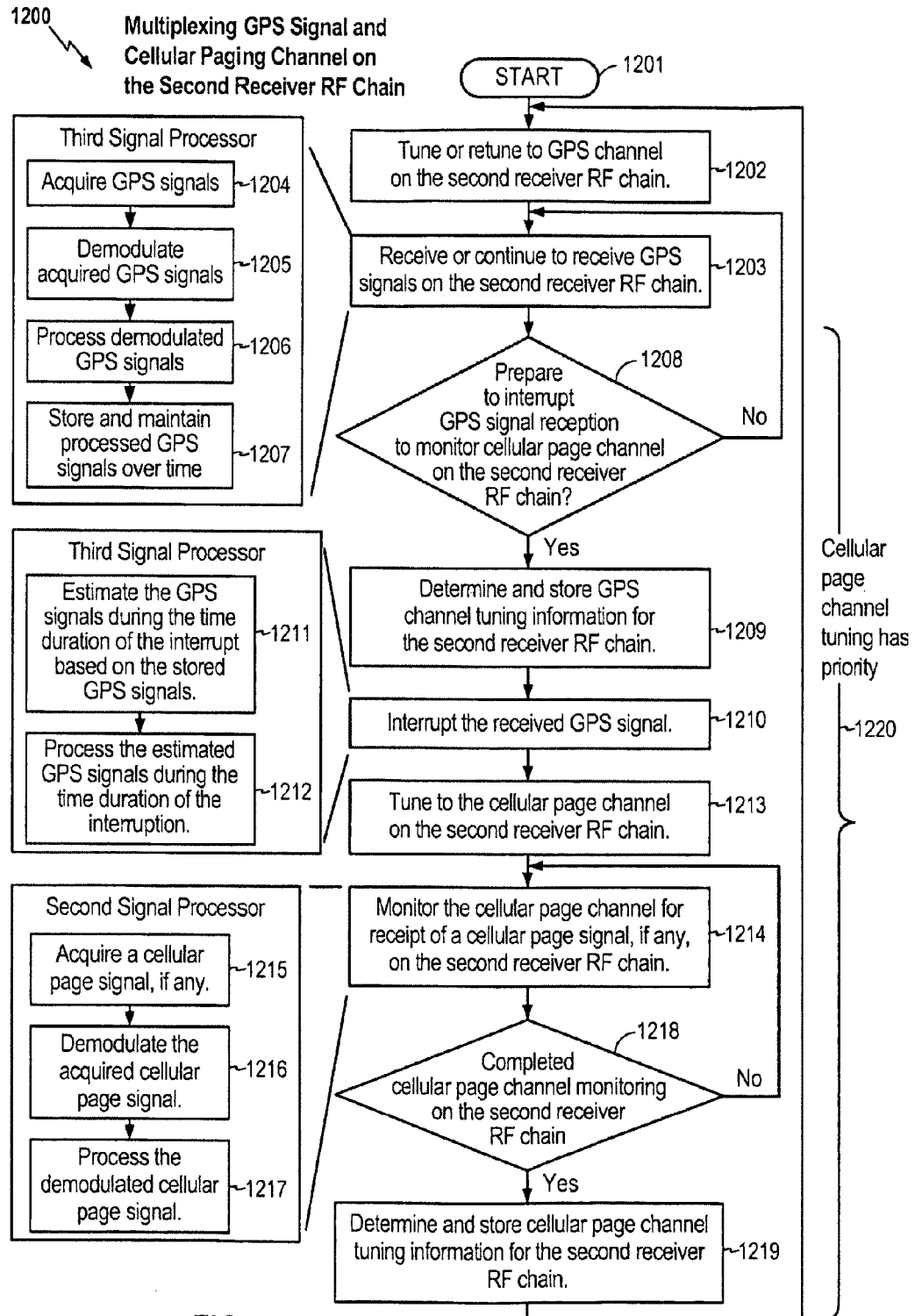
FIG. 12 illustrates an example of a method for multiplexing a GPS signal and a cellular paging signal on the second receiver RF chain, according to the signal diagram representation shown in FIG. 5.

FIG. 12 illustrates an example of a method 1200 for multiplexing a GPS signal 436 and a cellular paging signal 434 on the second receiver RF chain 206.

At block 1201, the method 1200 starts.

At block 1202, the RF transceiver 106 tunes or retunes, if continuing forward in time, to the GPS channel on the second receiver RF chain 206. At block 1203, the RF transceiver 106 receives or continues to receive, if continuing forward in time, the GPS signal 436 on the second receiver RF chain 206. Block 1203 further includes sub-blocks 1204 to 1207, each typically performed by the third (e.g., GPS) signal processor 242, as shown in FIG. 4.

At block 1204, the RF transceiver 106 acquires the GPS signal 436 to provide an acquired GPS signal. At block 1205, the RF transceiver 106 demodulates the acquired GPS signal to provide a demodulated GPS signal. At block 1206, the RF transceiver 106 processes the demodulated GPS signal to provide a processed GPS signal. At block 1207, the RF transceiver 106 stores and maintains the processed GPS signals over time (e.g., in the memory 408).

At block 1208, the RF transceiver 106 determines whether the RF transceiver 106 receives an indication to interrupt the reception of the GPS signal 436 on the second receiver RF chain 206 to tune to and monitor the cellular page channel. Such a determination is typically made by the controller 404 in response to the clock signal 444. If the determination at block 1208 is positive, the method 1200 continues to block 1209. If the determination at block 1208 is negative, the method 1200 returns to block 1203. As noted by reference number 1220, the reception of a cellular page signal 434 has priority over the reception of the OPS signals 436 on the second receiver RF chain 206.

At block 1209, the RF transceiver 106 determines and stores GPS channel tuning information for the second receiver RF chain 206. This permits the RF transceiver 106 to know the last and best known state of the GPS channel before interrupting the GPS signal 436. For the first (i.e., short term fade) and second (i.e., estimate GPS signal) approaches, the RF transceiver 106 can use the stored last and best known state of the GPS channel to retune the second receiver RF chain 206 back to the GPS channel after the "blank" cellular page channel time duration 503. For example, an estimate or a projection of the GPS channel may be determined based on the last and best known state of the GPS channel. Alternatively, the RF transceiver 106 can use the estimate OPS signal to retune the second receiver RF chain 206 back to the GPS channel after the "blank" cellular page channel time duration 503.

At block 1210, the RF transceiver 106 interrupts the GPS signal 436 being received on the second receiver RF chain 206, typically, in response to the routing signal information 416 from the controller 404. Block 1210 further includes sub-blocks 1211 to 1212, each typically performed by the third (e.g., GPS) signal processor 242, as shown in FIG. 4.

At block 1211, the RF transceiver 106 determines an estimate GPS signal 510 (otherwise called a "bridge signal") during the "blank" cellular page channel time duration 503 of the interruption. The RF transceiver 106 determines the estimate GPS signal 510 based on the most recently received and stored GPS signals 436.

At block 1212, the RF transceiver 106 processes the estimate GPS signal 510 during the cellular page channel time duration 503 of the interruption. Typically, the third (e.g., GPS) signal processor 242 performs the processing of the estimate GPS signal 510 by combining the GPS signal 436 with the estimate GPS signal 510 over time to provide a restored GPS signal.

At block 1213, the RF transceiver 106 tunes the second receiver RF chain 206 to the cellular paging channel. At block 1214, the RF transceiver 106 monitors the cellular page channel for receipt of the cellular page signal 434, if any is present on the channel, on the second receiver RF chain 206. Block 1214 further includes sub-blocks 1215 to 1217, each typically performed by the second (e.g., cellular) signal processor 240, as shown in FIG. 4.

At block 1215, the RF transceiver 106 acquires the cellular page signal 434 to provide an acquired cellular page signal. At block 1216, the RF transceiver 106 demodulates the acquired cellular page signal to provide a demodulated cellular page signal. At block 1217, the RF transceiver 106 processes the demodulated cellular page signal to provide a processed cellular page signal.

At block 1218, the RF transceiver 106 determines whether the RF transceiver has completed the monitoring during the cellular page channel time duration 503 on the second receiver RF chain 206. Such a determination is typically made by the controller 404 in response to the clock signal 444. If the determination at block 1218 is positive, the method 1200 continues to block 1219. If the determination at block 1218 is negative, the method 1200 returns to block 1214 to continue monitoring the cellular page channel for receipt of a cellular page signal.

At block 1219, the RF transceiver 106 determines and stores tuning information for the cellular page channel on the second receiver RF chain 206. This permits the RF transceiver 106 to know the last and best known state of the cellular page channel before continuing to receive the GPS signal 436. The RF transceiver 106 can use the stored last and best known state of the cellular page channel to retune the second receiver RF chain 206 back to the cellular page channel during the next "blank" cellular page channel time duration 503. For example, an estimate or a projection of the cellular page channel may be determined based on the last and best known state of the cellular page channel.

Figure 13:
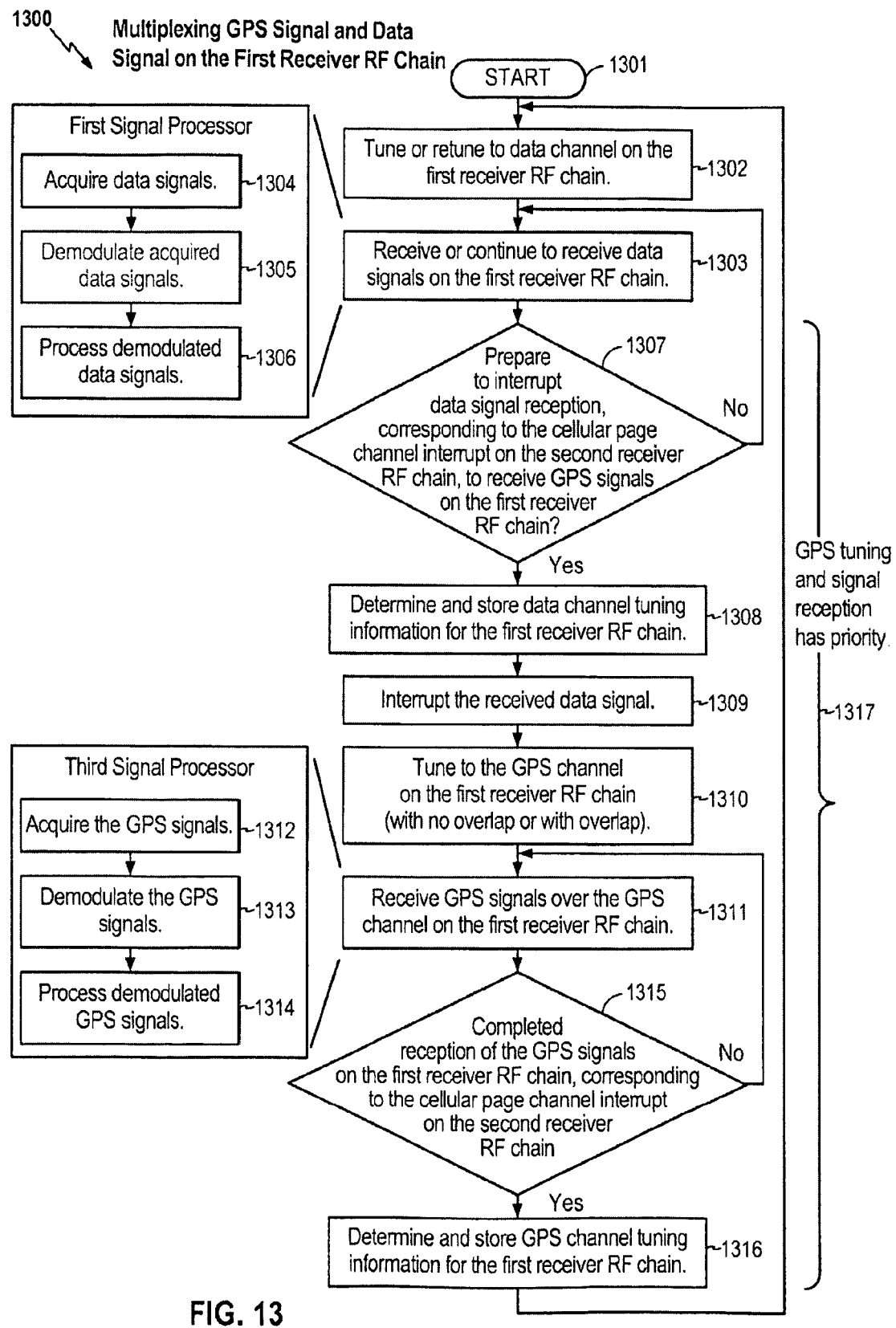
FIG. 13 illustrates an example of a method for multiplexing a GPS signal and a data signal on the first receiver RF chain, as shown in the signal diagram representations of FIGS. 6 and/or 7.

FIG. 13 illustrates an example of a method 1300 for multiplexing a GPS signal 430 and a data signal 426 on the first receiver RF chain 204.

At block 1301, the method 1300 starts.

At block 1302, the RF transceiver 106 tunes or retunes, if continuing forward in time, the first receiver RF chain 204 to the data channel.

At block 1303, the RF transceiver 106 receives or continues to receive, if continuing forward in time, data signals 426 on the first receiver RF chain 204. Block 1303 further includes sub-blocks 1304 to 1306, each typically performed by the first (e.g., data) signal processor 238, as shown in FIG. 4.

At block 1304, the RF transceiver 106 acquires the data signals 426 to provide acquired data signals. At block 1305, the RF transceiver 106 demodulates the acquired data signals to provide demodulated data signals. At block 1306, the RF transceiver 106 processes the demodulated data signals to provide processed data signals.

At block 1307, the RF transceiver 106 determines whether the RF transceiver receives an indication that the RF transceiver 106 should interrupt the reception of the data signal 426, corresponding to the cellular page channel time duration interruption on the second receiver RF chain 206, to receive OPS signals 430 on the first receiver RF chain 204. Such a determination is typically made by the controller 404 in response to the clock signal 444. If the determination at block 1307 is positive, the method 1300 continues to block 1308. If the determination at block 1307 is negative, the method 1300 returns to block 1303 to continue receiving the data signals 426. As noted by reference number 1317, the reception of the GPS signals 436 on the first receiver RF chain 204 has priority over the reception of the data signals 426 on the first receiver RF chain 204.

At block 1308, the RF transceiver 106 determines and stores data channel tuning information for the first receiver RF chain 204. This permits the RF transceiver 106 to know the last and best known state of the data channel before interrupting the data signal 426. The RF transceiver 106 can use the stored last and best known state of the data channel to retune the first receiver RF chain 204 back to the data channel after receiving the GPS signal 430, as shown in FIGS. 6 and 7. For example, an estimate or a projection of the data channel may be determined based on the last and best known state of the data channel.

At block 1309, the RF transceiver 106 interrupts the data signal 426 being received on the first receiver RF chain 204.

At block 1308, the RF transceiver determines and stores data channel tuning information for the first receiver RF chain 204. This permits the RF transceiver 106 to know the last and best known state of the data channel before interrupting the data signal 426. The RF transceiver 106 can use the stored last and best known state of the data channel to retune the first receiver RF chain 204 back to the data channel after receiving the GPS signal.

At block 1309, the RF transceiver 106 interrupts the data signal 426 being received on the first receiver RF chain 204.

At block 1310, the RF transceiver 106 tunes to the GPS channel for a time duration 602, corresponding to the cellular page channel time duration interruption on the second receiver RF chain 206, to receive GPS signals 430 on the first receiver RF chain 204, as shown in FIGS. 6 and 7. The GPS channel time duration 602 may not overlap and may be aligned in time with a beginning and/or an end of the corresponding cellular page channel time duration 503, as shown in FIG. 6. Alternatively, the GPS channel time duration 602 may overlap in lime with a beginning and/or an end of the corresponding cellular page channel time duration 503, as shown in FIG. 7.

At block 1311, the RF transceiver 106 receives GPS signals 430 (alternatively referred to as a "bridge signal") over the GPS channel on the first receiver RF chain 204. Block 1311 further includes sub-blocks 1312 to 1314, each typically performed by the third (e.g., GPS) signal processor 242, as shown in FIG. 4.

At block 1312, the RF transceiver 106 acquires the GPS signals 430 to provide acquired GPS signals. At block 1313, the RF transceiver 106 demodulates the acquired GPS signals to provide demodulated GPS signals. At block 1314, the RF transceiver 106 processes the demodulated GPS signals to provide processed GPS signals.

At block 1315, the RF transceiver 106 determines whether the RF transceiver 106 has completed the reception of the GPS signal 430 on the first receiver RF chain 204, corresponding to the cellular page channel time duration interruption on the second receiver RF chain 206. Such a determination is typically made by the controller 404 in response to the clock signal 444. If the determination at block 1315 is positive, the method 1300 continues to block 1316. If the determination at block 1315 is negative, the method 1300 returns to block 1311 to continue receiving the GPS signal 430 over the GPS channel on the first receiver RF chain 204.

At block 1316, the RF transceiver 106 determines and stores tuning information for the GPS channel on the first receiver RF chain 204. This permits the RF transceiver 106 to know the last and best known state of the GPS channel before continuing to receive the data signal 426. The RF transceiver 106 can use the stored last and best known state of the GPS channel to retune the first receiver RF chain 204 back to the GPS channel during the next GPS channel tuning time duration 602, as shown in FIGS. 6 and 7. For example, an estimate or a projection of the GPS channel may be determined based on the last and best known state of the GPS channel.

Figure 14:
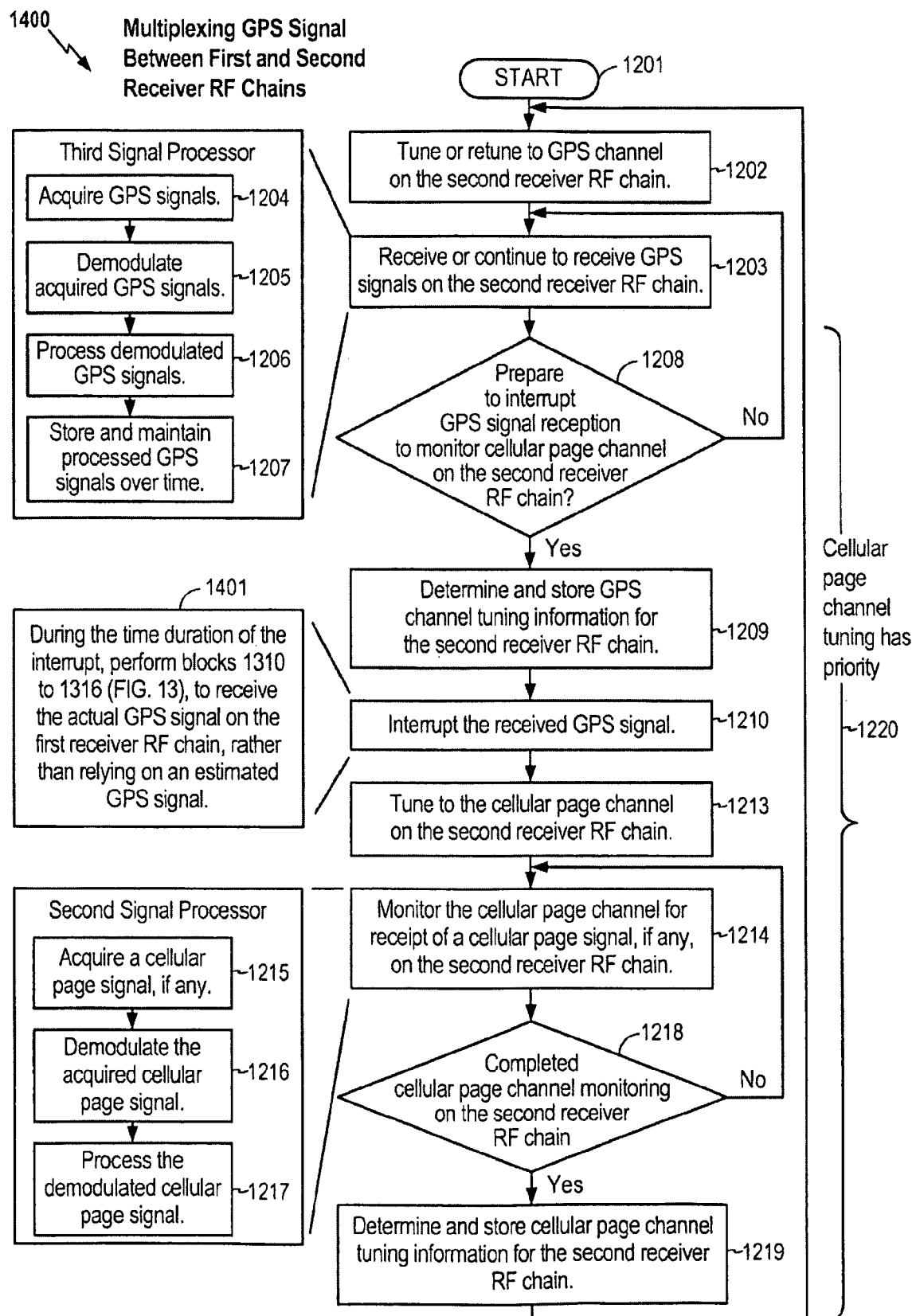
FIG. 14 illustrates an example of a method for multiplexing a GPS signal between the first receiver RF chain and the second receiver RF chain.

FIG. 14 illustrates an example of a method 1400 for multiplexing a GPS signal 436 between the first receiver RF chain 204 and the second receiver RF chain 206.

All of the blocks in FIG. 14 are the same as described for FIG. 12, with the exception of block 1401 in FIG. 14, which is not shown in FIG. 12. Moreover, blocks 1211 and 1212 are not shown in FIG. 14.

At block 1401, the RF transceiver 106 performs, during the time duration of the interrupt, the method 1300 in FIG. 13, blocks 1310 to 1316, to receive the actual GPS signal on the first receiver RF chain 204, rather than relying on an estimated GPS signal, as describe in blocks 1211 and 1212 in FIG. 12.

To ensure accurate operation after interrupting each receiver RF chain (i.e., when tuning to another channel), timing alignment should occur. More specifically, a sampling clock of the shared analog domain of the receiver RF chain is reset according to the channel being tuned. When the sampling clock returns to the timing of the interrupted channel (for example returning back to the timing associated with GPS), the phase of the sampling clock will likely be different from the phase prior to the interruption.

In GPS mode in particular, the accuracy of the GPS timing measurements relies on the receiver RF chain having a deterministic delay (i.e., phase certainty). The baseband filters (e.g., 310 and 322 in FIG. 3) running on the sample clock perform the functions of decimation and interpolation. These filters need to have a known phase after reset in order for there to be deterministic delay and delay matching in the receiver RF chain(s). Thus, in one embodiment, the filters have their phase adjusted. In another embodiment, the sample clock itself is adjusted.

To reduce the phase uncertainty, the sampling rate of the analog signal is increased above the Nyquist rate. After receiving the signal, it is down converted for digital processing at the Nyquist rate. In one example, the system time provided by the real time clock 406 is kept in a fine granularity (e.g., chip×8 or chip×32 granularity) to increase the sampling rate. Down conversion to a coarser rate (e.g., chip×2) then occurs in the frequency down conversion module 306 and/or 318. By sampling at the higher rate, phase uncertainty decreases. For example with a sampling rate of chip×32, the phase uncertainty will not exceed 1/32 chip, compared to the uncertainty of 1/2 chip that occurs with a sampling rate of chip×2. In a GPS system, 1/32 chip uncertainty corresponds to accuracy within approximately 10 meters, whereas 1/2 chip uncertainty corresponds to accuracy within approximately 150 meters.

During down sampling, phase corrections occur based upon a digital counter. The clock signal 444 is maintained (i.e., remains on) across the entire multiplexed transition. In one embodiment, the real time clock 406, acting as a digital clock, clocks the digital counter with a precision of 1/(32*1.0230) microseconds. By remaining on throughout the interruptions, the digital counter can facilitate the phase corrections by phase shifting the incoming data, appropriately.

In one example, the phase alignment ensures that all filters (e.g., 310 and 322 in FIG. 3) in the RF circuitry shared between each multiplexed function receive a reset signal when the least significant bit (LSB) of the clock signal 444 marks a GPS one half chip boundary. This alignment ensures that when the RF circuitry shared between each multiplexed function is switched (i.e., multiplexed) back and forth between GPS signal reception and cellular page reception, no delay uncertainty is introduced to the receiver. In other words, the receiver process advantageously provides a known and deterministic process that provides timely and quality reception of the multiplexed signals.

Alternative Implementations

In the present description or the provisional application, the designation that something is "optimized" "required" or other designation does not indicate that the current disclosure applies only to systems that are optimized or systems in which the "required" elements are not present (or other limitation due to other designations). These designations refer only to the particular described implementation. Of course, many implementations are possible, including any feature described, either individually or in combination with any feature, in any configuration, and any process described, in any order, using any modality. The techniques can be used with protocols other than those discussed herein, including protocols that are in development or to be developed.

The methodologies described herein may be implemented by various means depending upon the application. For example, these methodologies may be implemented in hardware, firmware, software, or any combination thereof. For a hardware implementation, the processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. Although the communication apparatus may not store all of the instructions and/or data on a computer readable medium.

The word "exemplary" is used herein to mean "serving as an example, instance, or illustration." Any embodiment or design described herein as "exemplary" is not necessarily to be construed as preferred or advantageous over other embodiments or designs.

Heading are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments, without departing from the spirit or scope of the present invention. Thus, the present invention is not intended to be limited to the embodiments shown herein but is to be accorded the widest scope consistent with the principles and novel features disclosed herein.

The discussion included in this patent application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
   tuning to a first channel on a first receiver radio frequency (RF) chain to permit receipt of a first signal during a first time duration;
   tuning to a second channel on the first receiver RF chain to permit receipt of a second signal during a second time duration, following the first time duration;
   providing a bridge signal, the bridge signal comprising an estimate of the first signal that was not received over the first channel on the first receiver RF chain during the second time duration and being representative of the first signal that was expected to be received over the first channel on the first receiver RF chain during the second time duration, to permit processing of the first signal during the first time duration;
   processing of the bridge signal during the second time duration by combining the first signal received during the first time duration with the estimate of the first signal to provide a restored first signal; and
   processing the first signal during the first time duration and during the second time duration using the restored first signal during the second time duration, without any apparent interruption of the first signal during the second time duration.

2. The method of claim 1, further comprising:
   tuning to the first channel on a second receiver RF chain, different from the first receiver RF chain, to permit receipt of the first signal over the first channel on the second receiver RF chain during a third time duration;
   wherein the bridge signal comprises the first signal actually received over the first channel on the second receiver RF chain during the second time duration.

3. The method of claim 2, wherein the third time duration corresponds to the second time duration and is aligned in time with a beginning of and an end of the second time duration.

4. The method of claim 2, wherein the third time duration corresponds to the second time duration and overlaps in time with at least one of a beginning of and an end of the second time duration.

5. The method of claim 1, further comprising:
   interrupting the receipt of the first signal over the first channel on the first receiver RF chain;
   wherein the tuning to the second channel is in response to the interrupting.

6. The method of claim 1, further comprising:
   determining first channel tuning information for the first channel on the first receiver RF chain before an end of the first time duration; and
   storing the first channel tuning information for the first channel in response to determining the first channel tuning information.

7. The method of claim 1, further comprising:
   determining second channel tuning information for the second channel on the first receiver RF chain before an end of the second time duration; and
   storing the second channel tuning information for the second channel in response to determining the second channel tuning information.

8. The method of claim 1, in which the first signal comprises a satellite positioning system (SPS) signal, and the method further comprises adjusting a phase of the SPS signal, once received, based upon a continuously-on digital counter.

9. The method of claim 8, in which the adjusting further comprises shifting the phase in a plurality of shared filters.

10. A radio frequency (RF) receiver comprising:
    a first receiver radio frequency (RF) chain;
    a first tuning signal processor configured to:
    tune to a first channel on the first receiver RF chain to permit receipt of a first signal over the first channel during a first time duration; and
    tune to a second channel on the first receiver RF chain to permit receipt of a second signal over the second channel during a second time duration, following the first time duration; and
    a first signal processor configured to:
    provide a bridge signal, the bridge signal comprising an estimate of the first signal that was not received over the first channel on the first receiver RF chain during the second time duration and being representative of the first signal that was expected to be received over the first channel on the first receiver RF chain during the second time duration, to permit processing of the first signal during the first time duration;
    process the bridge signal during the second time duration by combining the first signal received during the first time duration with the estimate of the first signal to provide a restored first signal; and
    process the first signal during the first time duration and during the second time duration using the restored first signal during the second time duration, without any apparent interruption of the first signal during the second time duration.

11. The RF receiver of claim 10, further comprising:
    a second receiver RF chain, different from the first receiver RF chain; and
    a second tuning signal processor that tunes to the first channel on the second receiver RF chain to permit receipt of the first signal over the first channel on the second receiver RF chain during the second time duration;
    wherein the first signal processor processes the first signal from the first receiver RF chain during the first time duration and processes the first signal from the second receiver RF chain during the second time duration to provide a reconstituted first signal, without any apparent interruption of the first signal on the first receiver RF chain during the second time duration.

12. The RF receiver of claim 10, comprising:
a real time clock, coupled to the first tuning signal processor, for providing a clock signal on which to time the tuning to the first channel during the first time duration and to time the tuning to the second channel during the second time duration.

13. A radio frequency (RF) receiver comprising:
means for tuning to a first channel on a receiver radio frequency (RF) chain to permit receipt of a first signal over the first channel during a first time duration;
means for tuning to a second channel on the receiver RF chain to permit receipt of a second signal over the second channel during a second time duration, following the first time duration;
means for providing a bridge signal, the bridge signal comprising an estimate of the first signal that was not received over the first channel on the first receiver RF chain during the second time duration and being representative of the first signal that was expected to be received over the first channel on the first receiver RF chain during the second time duration, to permit processing of the first signal during the first time duration;
means processing of the bridge signal during the second time duration by combining the first signal received during the first time duration with the estimate of the first signal to provide a restored first signal; and
means for processing the first signal during the first time duration and during the second time duration using the restored first signal during the second time duration, without any apparent interruption of the first signal during the second time duration.

14. A non-transitory computer readable medium tangibly storing program code, comprising:
program code to tune to a first channel on a receiver radio frequency (RF) chain to permit receipt of a first signal over the first channel during a first time duration;
program code to tune to a second channel on the receiver RF chain to permit receipt of a second signal over the second channel during a second time duration, following the first time duration;
program code to provide a bridge signal, the bridge signal comprising an estimate of the first signal that was not received over the first channel on the first receiver RF chain during the second time duration and being representative of the first signal that was expected to be received over the first channel on the first receiver RF chain during the second time duration, to permit processing of the first signal during the first time duration;
program code to process the bridge signal during the second time duration by combining the first signal received during the first time duration with the estimate of the first signal to provide a restored first signal; and
program code to process the first signal during the first time duration and during the second time duration using the restored first signal during the second time duration, without any apparent interruption of the first signal during the second time duration.

\* \* \* \* \*